US010970809B1

(12) United States Patent
Seiler

(10) Patent No.: US 10,970,809 B1
(45) Date of Patent: Apr. 6, 2021

(54) TEXTURE MEMORY STORAGE

(71) Applicant: Facebook Technologies, LLC, Menlo Park, CA (US)

(72) Inventor: Larry Seiler, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/589,655

(22) Filed: Oct. 1, 2019

Related U.S. Application Data

(60) Provisional application No. 62/755,313, filed on Nov. 2, 2018.

(51) Int. Cl.
*G06T 1/60* (2006.01)
*G06F 12/06* (2006.01)

(52) U.S. Cl.
CPC ............ *G06T 1/60* (2013.01); *G06F 12/0646* (2013.01); *G06F 2212/1041* (2013.01)

(58) Field of Classification Search
None
See application file for complete search history.

(56) References Cited

U.S. PATENT DOCUMENTS

| 5,495,563 | A | * | 2/1996 | Winser | G06T 15/04 345/582 |
| 6,614,443 | B1 | * | 9/2003 | Peterson | G06F 3/1407 345/552 |
| 2002/0060684 | A1 | * | 5/2002 | Alcorn | G09G 5/393 345/552 |
| 2012/0176377 | A1 | * | 7/2012 | Donovan | G06T 1/60 345/419 |
| 2016/0071232 | A1 | * | 3/2016 | Goodman | G06T 1/60 345/582 |

* cited by examiner

*Primary Examiner* — Robert J Craddock
(74) *Attorney, Agent, or Firm* — Baker Botts L.L.P.

(57) ABSTRACT

In one embodiment, a computing system may receive a number of texels organized into a two-dimensional array. The system may generate addresses for the texels based on one or more mapping rules which may map the texels from the two-dimension array into a one-dimensional array of a pre-determined size in a texel order. The system may store the texels organized in the one-dimensional array into a memory block having the pre-determined size. The system may read texels from the memory block onto a data bus including a number of data lines corresponding to different combinations of low order address bits of addresses of the texels within the two-dimension array. The texel order of the one-dimensional array may map texels having same low order address bits into same data lines. The system may load the texels directly into a number of buffer memory blocks through the data bus.

20 Claims, 23 Drawing Sheets

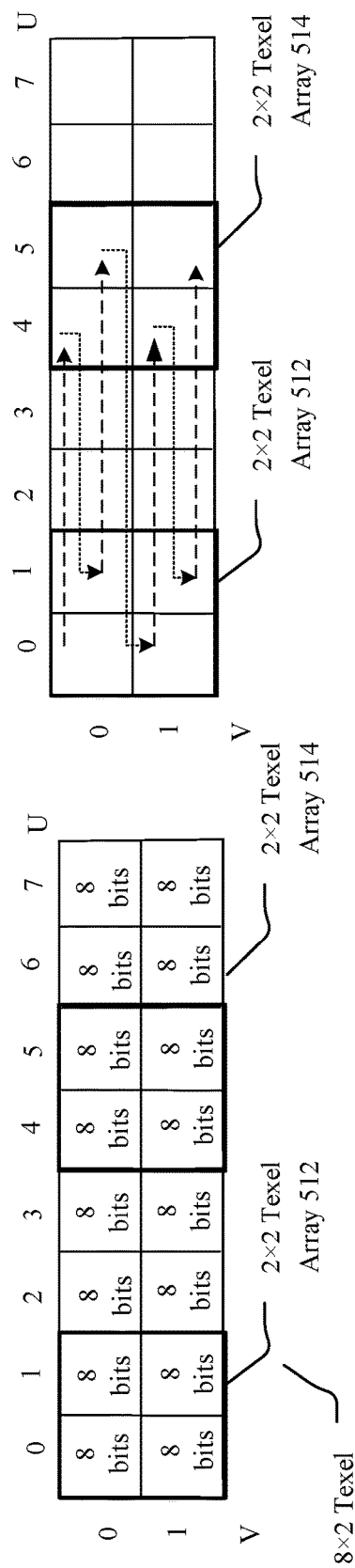
FIG. 5A
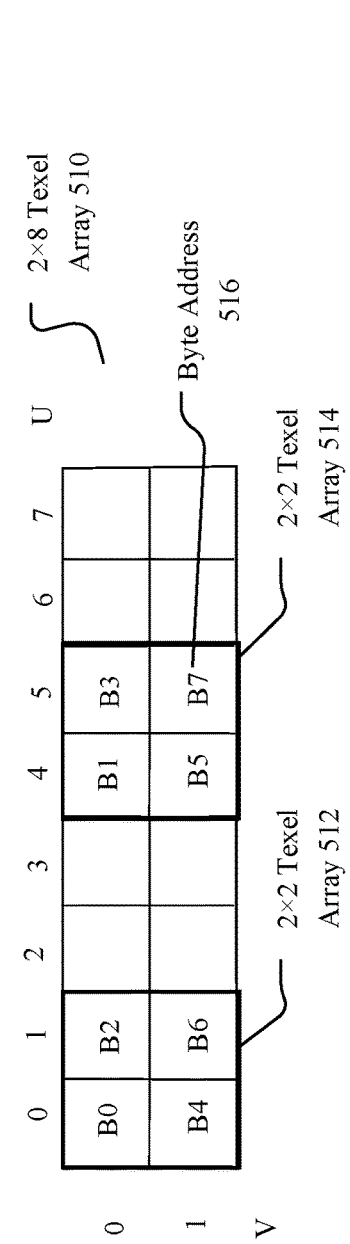
FIG. 5B
FIG. 5C
FIG. 5D

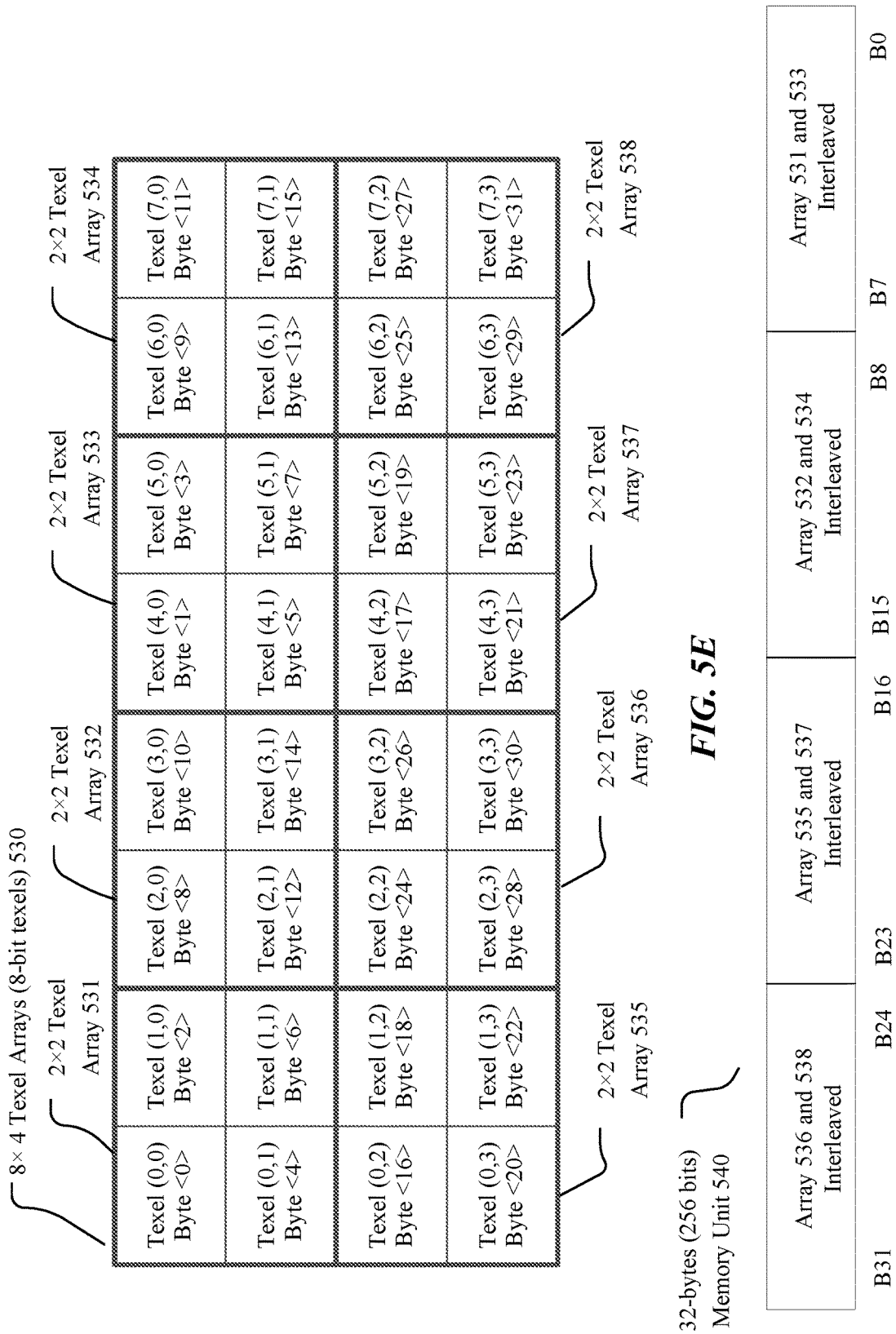

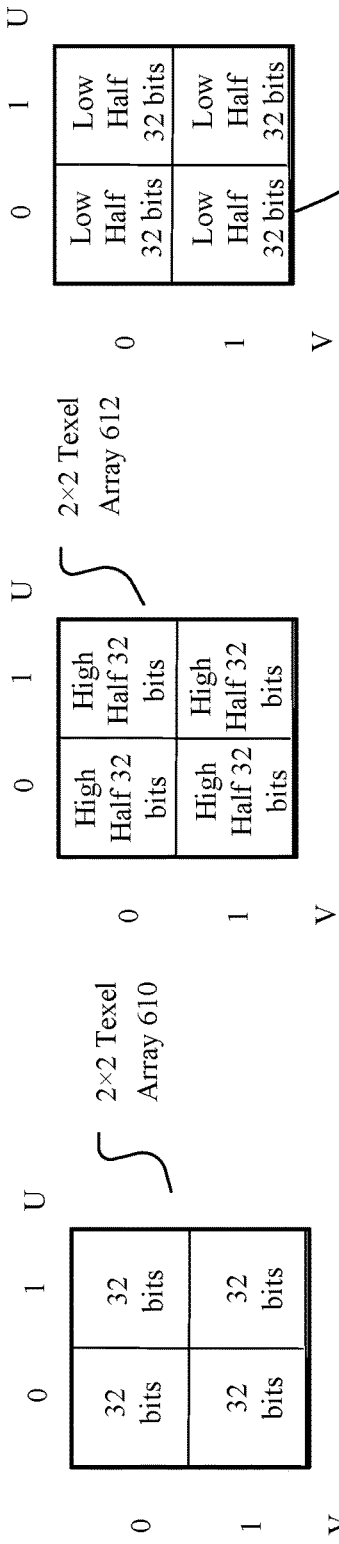
FIG. 6A
FIG. 6B
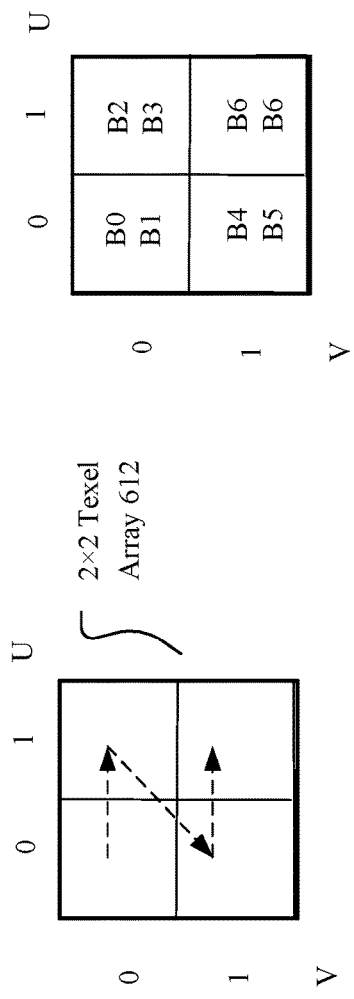
FIG. 6C
FIG. 6D
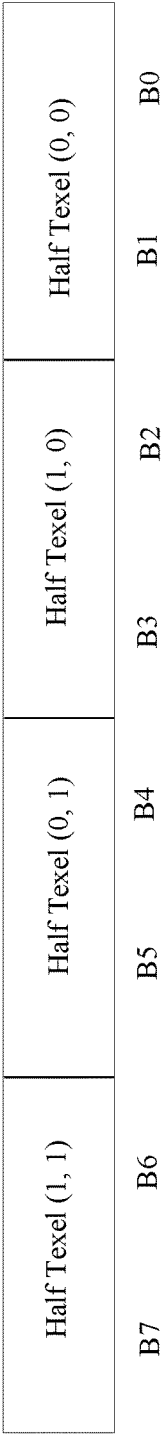
FIG. 6E

FIG. 6F

| Texel (0,0)<br>B <33:32><br>B <1:0> | Texel (1,0)<br>B <35:34><br>B <3:2> | Texel (2,0)<br>B <41:40><br>B <9:8> | Texel (3,0)<br>B <43:42><br>B <11:10> |
|---|---|---|---|
| Texel (0,1)<br>B <37:36><br>B <5:4> | Texel (1,1)<br>B <39:38><br>B <7:6> | Texel (2,1)<br>B <45:44><br>B <13:12> | Texel (3,1)<br>B <47:46><br>B <15:14> |
| Texel (0,2)<br>B <49:48><br>B <17:16> | Texel (1,2)<br>B <51:50><br>B <19:18> | Texel (2,2)<br>B <57:56><br>B <25:24> | Texel (3,2)<br>B <59:58><br>B <27:26> |
| Texel (0,3)<br>B <53:52><br>B <21:20> | Texel (1,3)<br>B <55:54><br>B <23:22> | Texel (2,3)<br>B <61:60><br>B <29:28> | Texel (3,3)<br>B <63:62><br>B <31:30> |

4×4 of 32-bit Texels (Mapped to 64-byte Memory Unit) 630

FIG. 6G 64-byte Memory Unit 640

| B0<br>B1 | B2<br>B3 | B4<br>B5 | B6<br>B7 | B8<br>B9 | B10<br>B11 | B12<br>B13 | B14<br>B15 | B16<br>B17 | B18<br>B19 | B20<br>B21 | B22<br>B23 | B24<br>B25 | B26<br>B27 | B28<br>B29 | B30<br>B31 |
|---|---|---|---|---|---|---|---|---|---|---|---|---|---|---|---|
| (0, 0) | (1, 0) | (0, 1) | (1, 1) | (2, 0) | (3, 0) | (2, 1) | (3, 1) | (0, 2) | (1, 2) | (0, 3) | (1, 3) | (2, 2) | (3, 2) | (2, 3) | (3, 3) |
| (0, 0) | (1, 0) | (0, 1) | (1, 1) | (2, 0) | (3, 0) | (2, 1) | (3, 1) | (0, 2) | (1, 2) | (0, 3) | (1, 3) | (2, 2) | (3, 2) | (2, 3) | (3, 3) |
| B32<br>B33 | B34<br>B35 | B36<br>B37 | B38<br>B39 | B40<br>B41 | B42<br>B43 | B44<br>B45 | B46<br>B47 | B48<br>B49 | B50<br>B51 | B52<br>B53 | B54<br>B55 | B56<br>B57 | B58<br>B59 | B60<br>B61 | B62<br>B63 |

*FIG. 12B*

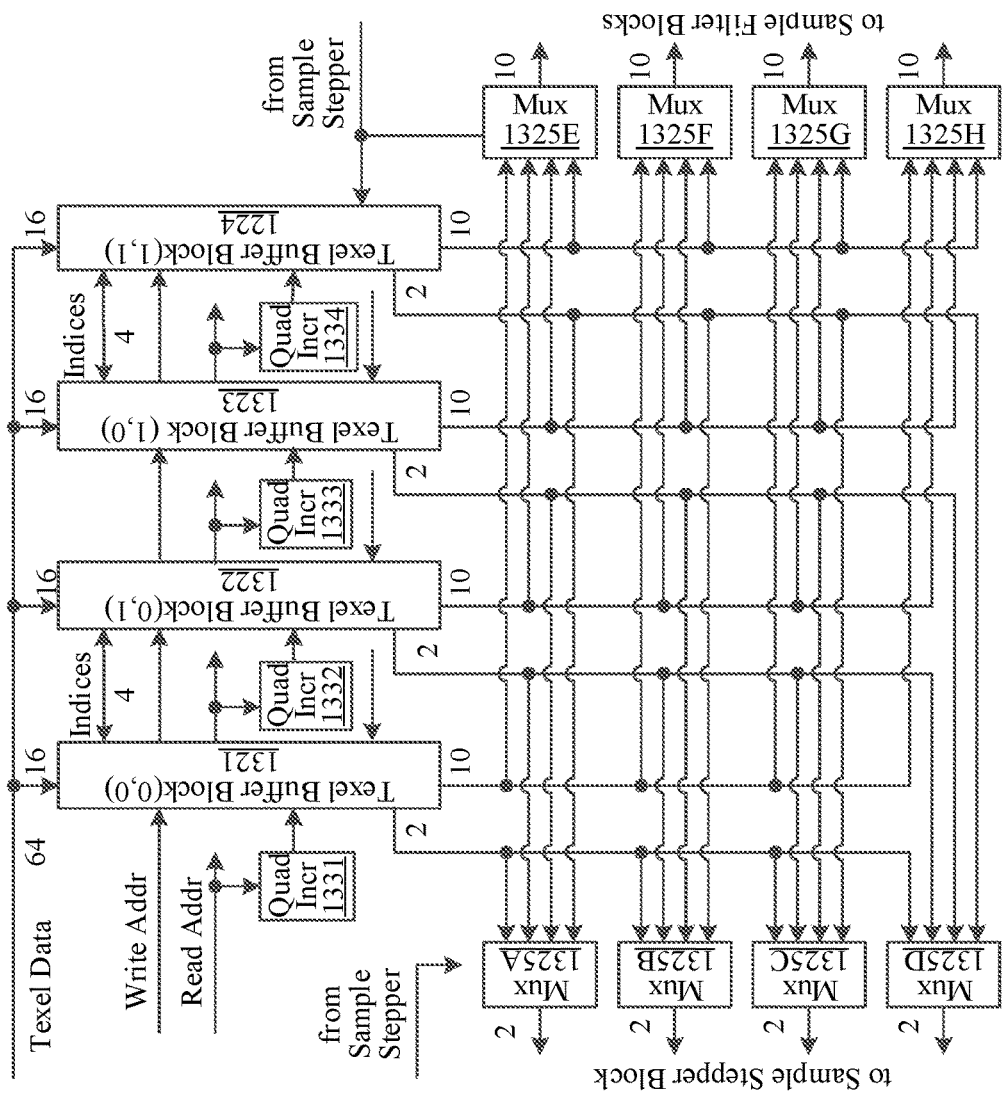
FIG. 13B
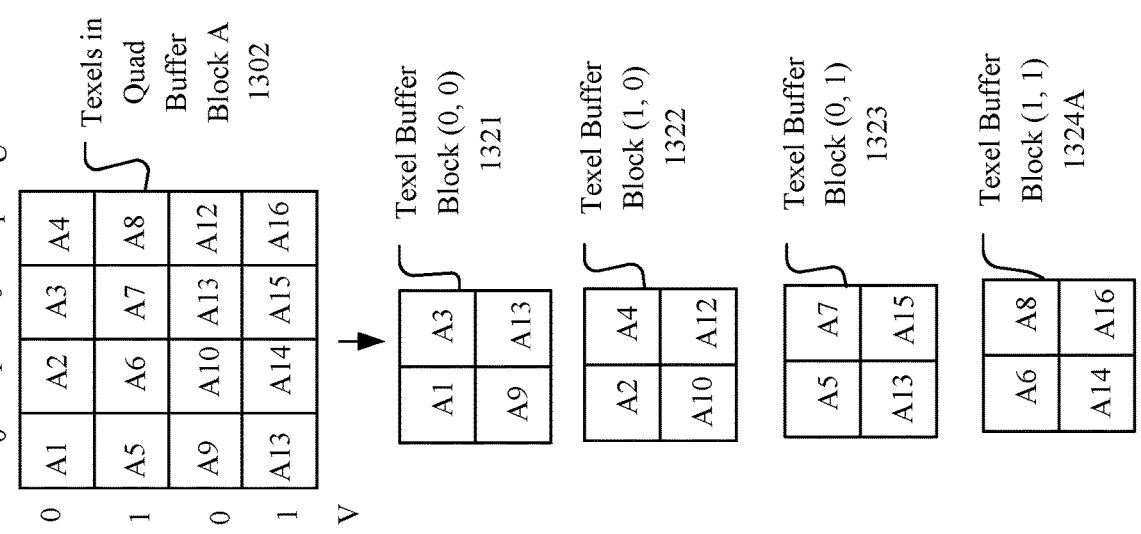

TEXTURE MEMORY STORAGE

PRIORITY

This application claims the benefit, under 35 U.S.C. § 119(e), of U.S. Provisional Patent Application No. 62/755,313, filed 2 Nov. 2018, which is incorporated herein by reference.

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of using a multi-level memory architecture with a number of independent memory blocks in texel buffer to allow the texel data to be loaded from texel memory to the texel buffer without multiplexing operations. The system may use a swizzle pattern to store 2D texel arrays (e.g., 4×4 texel array, 8×4 texel array) in one or more texel memory units (e.g., 256-bit memory unit) each of which can be read out with one read operation. The system may convert input stream data into texels with required formats and group the texels into texel arrays. The system may generate addresses for texels in each texel array based on a number of mapping rules which map the texels to memory space in a swizzle pattern or an interleaved swizzle pattern that allows that texel array to be contained within a texel memory unit that can be read out using one read operation. The system may store the texels in one or more memory units in the swizzle pattern as determined by the mapping rules. The system may support a number of texel data formats (e.g., RGBA formats, distance field/color index format) and a number of texel sizes (e.g., 8-bit texel, 16-bit texel, 32-bit texel). The system may parallelly retrieve a texel array from a memory unit (which stores the texel array in the swizzle pattern) using one read operation, no matter which supported format is used by the texels. The system may include a number of logic banks which are mapped to an address place in an interleaved order. The texel data stored in texel memory may be retrieved from the texel memory in 256-bit data units (i.e., 256-bit words) each including four 64-bit sub-units (i.e., 64-bit sub-words) which can be directed routed into four quad texel blocks through 64-bit data bus without multiplexing. Each 64-data unit may be divided into four 16-bit data units which can be directed routed into four texel buffer blocks in each quad texel block without multiplexing. Particular embodiments of the system may allow the texel data to be addressed and retrieved from texel memory in smaller data units (e.g., 64-bit data units or sub-words) than a 256-bit unit to reduce the wasted read operations and improve memory access efficiency. Particular embodiments of the system reduce the wasted read operations for retrieving texel arrays from memory, minimize the amount of multiplexing required to support multiple formats of texel data, eliminate multiplexing needed for loading texel data from texel memory into texel buffer, and provide faster memory reading with reduced power consumption and operation logic usage.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5A-5D illustrate an example of two 2×2 8-bit texel arrays stored in an 8-byte memory unit with an interleaved swizzle pattern.

FIGS. 5E-5F illustrate an example 8×4 8-bit texel array stored in a 32-byte memory unit in an interleaved swizzle pattern.

FIGS. 6A-6E illustrate an example 2×2 32-bit texel array divided into two 2×2 16-bit texel arrays to be stored in 8-byte memory units in a swizzle pattern.

FIGS. 6F-6G illustrate an example 4×4 32-bit texel array which is mapped to a 64-byte memory unit in a swizzle pattern.

FIG. 12B illustrates an example pattern for mapping the logic banks to corresponding addresses.

FIG. 13B illustrates an example diagram for quad buffer block.

DESCRIPTION OF EXAMPLE EMBODIMENTS

Artificial reality systems may use a swizzle pattern to store a 2D texel array (e.g., 2×2, 4×4, 16×16, etc.) in texel memory. However, when retrieving the 2D texel array from memory, traditional artificial reality systems need excessive multiplexing operations for reading the texel data from texel memory, selecting and assembling texels into appropriate groups, and loading the necessary texels in appropriate pattern into texel buffer. The excessive multiplexing operations make the data loading processes very inefficient. Moreover, although the swizzle patterns allow efficient reading of aligned texel arrays, reading unaligned texel arrays may pick up some texels that are not needed, and therefore have wasted read operations.

To solve these problems, particular embodiments of the system may use a multi-level memory architecture with a number of independent memory blocks in texel buffer to allow the texel data to be loaded from texel memory to the texel buffer without multiplexing operations. Particular embodiments of the system may use a swizzle pattern to store 2D texel arrays in one or more memory units (e.g., 256-bit memory unit), each of which can be read out with one read operation. The texel data stored in texel memory may be retrieved from the texel memory in 256-bit data units (i.e., 256-bit words) each including four 64-bit sub-units (i.e., 64-bit sub-words) which can be directed routed into four quad texel blocks through 64-bit data bus without multiplexing. Each 64-data unit may be divided into four 16-bit data units which can be directed routed into four texel buffer blocks in each quad texel block without multiplexing. Particular embodiments of the system may allow the texel data to be addressed and retrieved from texel memory in smaller data units (e.g., 64-bit data unit or sub-word) than a 256-bit unit to reduce the wasted read operations and improve memory access efficiency.

Particular embodiments of the system eliminate multiplexing when loading the texel data from texel memory to texel buffer through the data bus connecting texel memory to texel buffer. Particular embodiments of the system minimize the amount of multiplexing required to support multiple formats of texel data. Particular embodiments of the system may reduce the wasted read operations for retrieving texel data from texel memory by allowing the texel data to be addressed and retrieved small data units (e.g., 64-bit data unit). Particular embodiments of the system provide faster memory reading to retrieve the texels that are need for interpolation to determine corresponding pixels and reduce power consumption and operation logic usage for retrieving texels from memory.

Figure 1A:
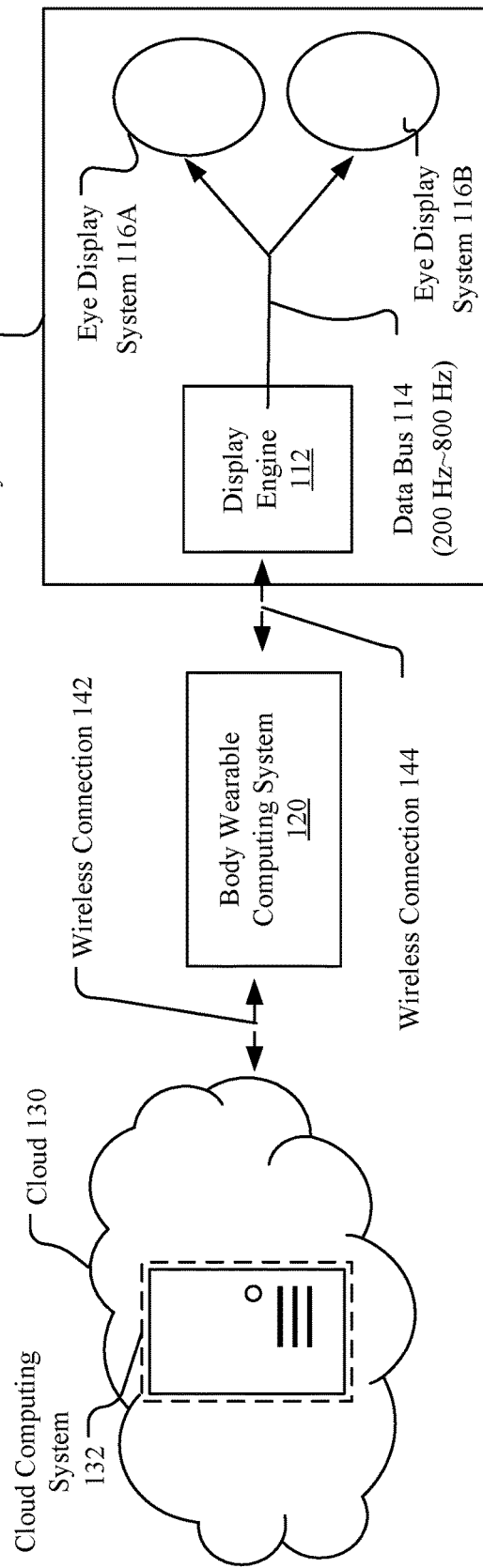
FIG. 1A illustrates an example artificial reality system.

FIG. 1A illustrates an example artificial reality system 100. In particular embodiments, the artificial reality system 100 may include a headset system 110, a body wearable computing system 120, a cloud computing system 132 in a cloud 130, etc. In particular embodiments, the headset system 110 may include a display engine 112 which is connected to two eye display systems 116A and 116B through a data bus 114. The headset system 110 may be a system including a head-mounted display (HMD) which may be mounted on a user's head to provide artificial reality to the user. The headset system 110 may have limited amount of power available in its power sources (e.g., batteries). The display engine 112 may provide display data to the eye display systems 116A and 116B though the data bus 114 with relative high data rates (e.g., 200 Hz-800 Hz). As will be discussed later, the display engine 112 may include one or more controller blocks, texel memories, transform blocks, pixel blocks, etc. The texels stored in the texel memories may be accessed by pixel blocks and may be provided to the eye display systems 116A and 116B for display.

Figure 1B:
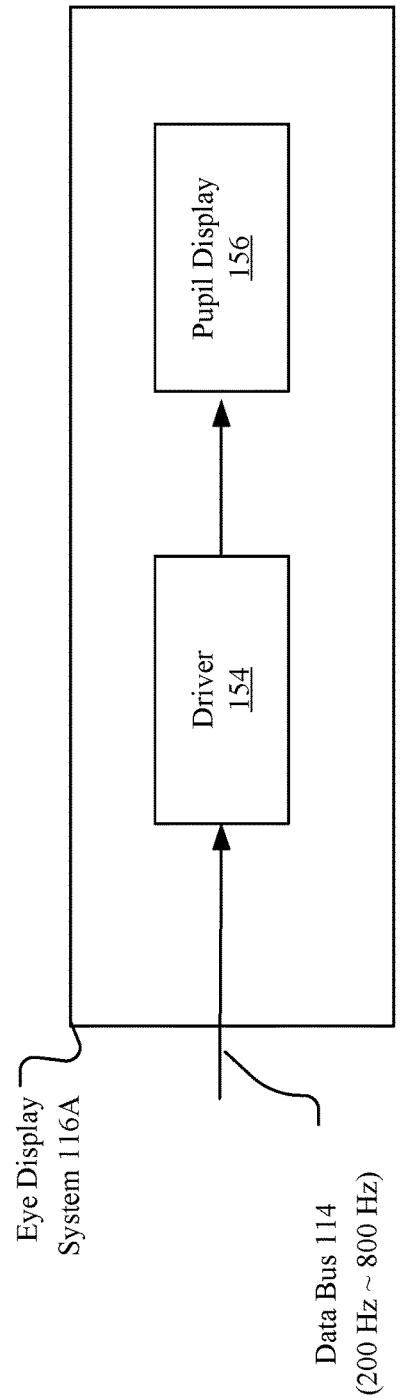
FIG. 1B illustrates an example eye display system of the headset system.

In particular embodiments, the body wearable computing system 120 may be worn on the body of a user. In particular embodiments, the body wearable computing system 120 may be a computing system (e.g., a laptop, a desktop, a mobile computing system) that is not worn on a user body. The body wearable computing system 120 may include one or more GPUs, one or more smart video decoders, memories, processors, and other modules. The body wearable computing system 120 may have more computational resources than the display engine 112 but may still have limited amount power in its power sources (e.g., batteries). The body wearable computing system 120 may be coupled with the headset system 110 through a wireless connection 144. The cloud computing system 132 may be high performance computers (e.g., servers) and may communicate with the body wearable computing system 120 through a wireless connection 142. FIG. 1B illustrates an example eye display system (e.g., 116A or 116B) of the headset system 110. In particular embodiments, the eye display system 116A may include a driver 154, a pupil display 156, etc. The display engine 112 may provide display data to the pupil display 156 the data bus 114 and the driver 154 at high data rates (e.g., 200 Hz-800 Hz).

Figure 2:
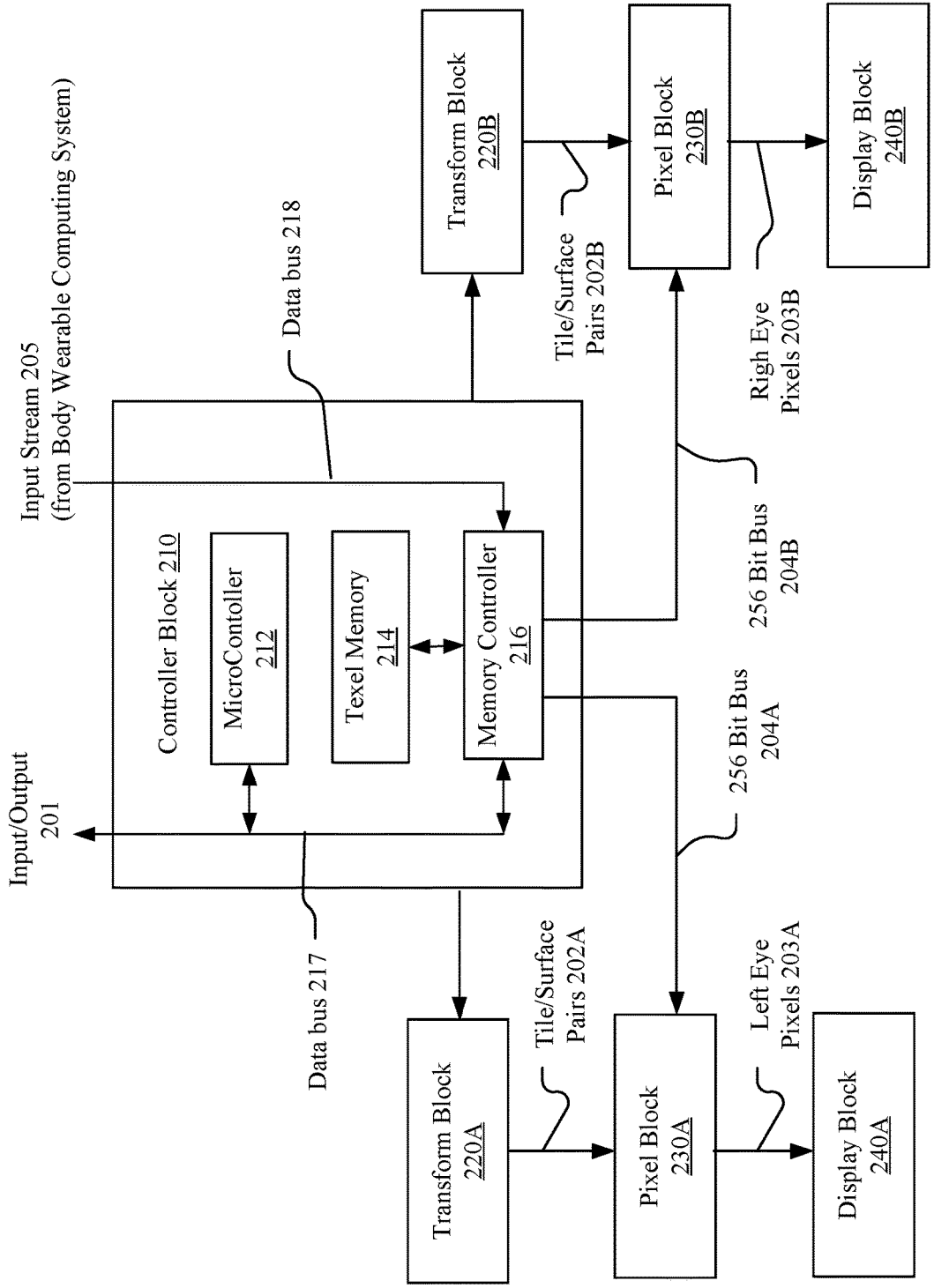
FIG. 2 illustrates a system diagram for a display engine.

FIG. 2 illustrates a system diagram for a display engine 112. In particular embodiments, the display engine 112 may include a control block 210, transform blocks 220A and 220B, pixel blocks 230A and 230B, display blocks 240A and 240B, etc. One or more of the components of the display engine 112 may be configured to communicate via a high-speed bus, shared memory, or any other suitable method. As shown in FIG. 2, the control block 210 of display engine 112 may be configured to communicate with the transform blocks 220A and 220B, pixel blocks 230A and 230B, and display blocks 240A and 240B. As explained in further detail herein, this communication may include data as well as control signals, interrupts and other instructions.

In particular embodiments, the control block 210 may receive input from the body wearable computing system (e.g., 114 in FIG. 1) and initialize a pipeline in the display engine to finalize the rendering for display. In particular embodiments, the control block 210 may receive data and control packets from the body wearable computing system. The data and control packets may include information such as one or more surfaces comprising texture data and position data and additional rendering instructions. The control block 210 may distribute data as needed to one or more other blocks of the display engine 112. The control block 210 may initiate pipeline processing for one or more frames to be displayed. In particular embodiments, the eye display systems 116A and 116B may each comprise its own control block 210. In particular embodiments, one or more of the eye display systems 116A and 116B may share a control block 210.

In particular embodiments, the transform blocks 220A and 220B may determine initial visibility information for surfaces to be displayed in the artificial reality scene. In general, the transform blocks 220A and 220B may cast rays from pixel locations on the screen and produce filter commands (e.g., filtering based on bilinear or other types of interpolation techniques) to send to the pixel blocks 230A and 230B. The transform blocks 220A and 220B may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and may produce results to send to the pixel blocks 230A and 230B.

In general, the transform blocks 220A and 220B may each comprise a four-stage pipeline, in accordance with particular embodiments. The stages of a transform block 220A or 220B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems 116A and 116B of the headset system 110. The transform blocks 220A and 220B may determine whether each ray bundle intersects with surfaces in the scene by comparing a bounding box of each tile to bounding boxes for the surfaces. If a ray bundle does not intersect with an object, it may be discarded. Tile-surface intersections are detected, and the corresponding tile-surface pair is passed to the pixel blocks 230A and 230B.

In general, the pixel blocks 230A and 230B may determine color values from the tile-surface pairs to produce pixel color values, in accordance with particular embodiments. The color values for each pixel may be sampled from the texture data of surfaces received and stored by the control block 210. The pixel blocks 230A and 230B may receive tile-surface pairs from the transform blocks 220A and 220B and may schedule bilinear filtering. For each tile-surface pair, the pixel blocks 230A and 230B may sample color information for the pixels within the tile using color values corresponding to where the projected tile intersects the surface. In particular embodiments, the pixel blocks 230A and 230B may process the red, green, and blue color components separately for each pixel. In particular embodiments, the pixel block 230A of the display engine 112 of the first eye display system 116A may proceed independently, and in parallel with, the pixel block 230B of the display engine 112 of the second eye display system 116B. The pixel block may then output its color determinations to the display block.

In general, the display blocks 240A and 240B may receive pixel color values from the pixel blocks 230A and 230B, coverts the format of the data to be more suitable for the scanline output of the display, apply one or more brightness corrections to the pixel color values, and prepare the pixel color values for output to the display. The display blocks 240A and 240B may convert tile-order pixel color values generated by the pixel blocks 230A and 230B into scanline or row-order data, which may be required by the physical displays. The brightness corrections may include any required brightness correction, gamma mapping, and dithering. The display blocks 240A and 240B may output the corrected pixel color values directly to the physical display (e.g., pupil display 156 in FIG. 1 via the driver 154) or may output the pixel values to a block external to the display engine 112 in a variety of formats. For example, the eye display systems 116A and 116B or headset system 110 may comprise additional hardware or software to further customize backend color processing, to support a wider interface to the display, or to optimize display speed or fidelity.

In particular embodiments, the controller block 210 may include a microcontroller 212, a texel memory 214, a memory controller 216, a data bus 217 for I/O communication, a data bus 218 for input stream data 205, etc. The memory controller 216 and the microcontroller 212 may be coupled through the data bus 217 for I/O communication with other modules of the system. The microcontroller 212 may receive control packages such as position data and surface information though the data bus 217. The input stream data 205 may be input to controller blocks 210 from the body wearable computing system after being set up by the microcontroller 212. The input stream data 205 may be converted to the required texel format and stored into the texture memory 214 by the memory controller 216. In particular embodiments, the texel memory 214 may be static random-access memory (SRAM).

In particular embodiments, the body wearable computing system may send input stream data 205 to the memory controller 216, which may convert the input stream data into texels with required formats and store the texels with swizzle patterns in the texel memory 214. The texel memory organized in these swizzle patterns may allow the texels (e.g., in 4×4 texel blocks) that are needed for determining at least one color component (e.g., red, green, and/or blue) of every pixel associated with a tile (e.g., "tile" refers to an aligned block of pixels, such as a block of 16×16 pixels) to be retrieved by the pixel bocks 230A and 230B using one read operation. As a result, the headset could avoid the excess multiplexing operations that are needed for reading and assembling texel array if the texel array is not stored in such patterns, and therefore reduces computational resource requirement and power consumption of the headset system.

In particular embodiments, the pixel blocks 220A and 220B may generate pixel data for display based on retrieved texels from the texel memory 214. The memory controller 216 may be coupled to pixel blocks 230A and 230B through two 256 bits data buses 204A and 204B, respectively. The pixel bocks 230A and 230B may receive the tile/surface pair from the respective transform blocks 220A and 220B and may identify the texels that are needed to determine at least one color component of all the pixels associated with the tile. The pixel blocks 230A and 230B may parallelly retrieve the identified texels (e.g., a 4×4 texel array) from the texel memory 214 through the memory controller 216 and the 256 bits data buses 204A and 204B. For example, the 4×4 texel array that are needed to determine at least one color component of all the pixels associated with a tile may be stored in one memory block and may be retrieved from the texel memory 214 using one memory read operation. The pixel blocks 230A and 230B may use multiple sample filter blocks (e.g., one or each color component) to parallelly perform interpolation on different groups of texels to determine the corresponding color component for the corresponding pixels. The pixels values may be sent to the display blocks 240A and 240B for further processing before being displayed by the eye display systems 116A and 116B, respectively.

In particular embodiments, the system may use one texture memory to store the texture data which is used by the rendering pipelines of both eyes. In particular embodiments, the two pixel blocks 230A and 230B may processes data for the two eyes in parallel and may have independent states because the two displays may be not synced. Typically, labels (e.g., fonts, characters, glyphs, etc.) and images may be rendered to both eyes. For example, the GPU-generated images may be rendered to both eyes when the images are far away enough from a viewer's perspective so that the stereo separation is minimal. Since in most cases both eyes will need the same texture data, processing both eyes in the same chip allows that data to be stored once instead of twice. As a result, it is beneficial to use a single texture memory to store the texture data for both eye pipelines. Even for GPU-generated images, separate stereoscopic images may be required only for near objects. If the background is rendered separately, for example, to allow foreground objects to move relative to the background, a stereo background image may not be required in general. In particular embodiments, the system may render an object that requires stereo view using a separate texel array for each eye. In particular embodiments, the system may use a shared texel array for both eye pipelines and each eye pipeline (e.g., pixel block) may access the shared texel array separately since there may be no reliable correlation about where the object may appear in each eye's field of view.

Figure 3A:
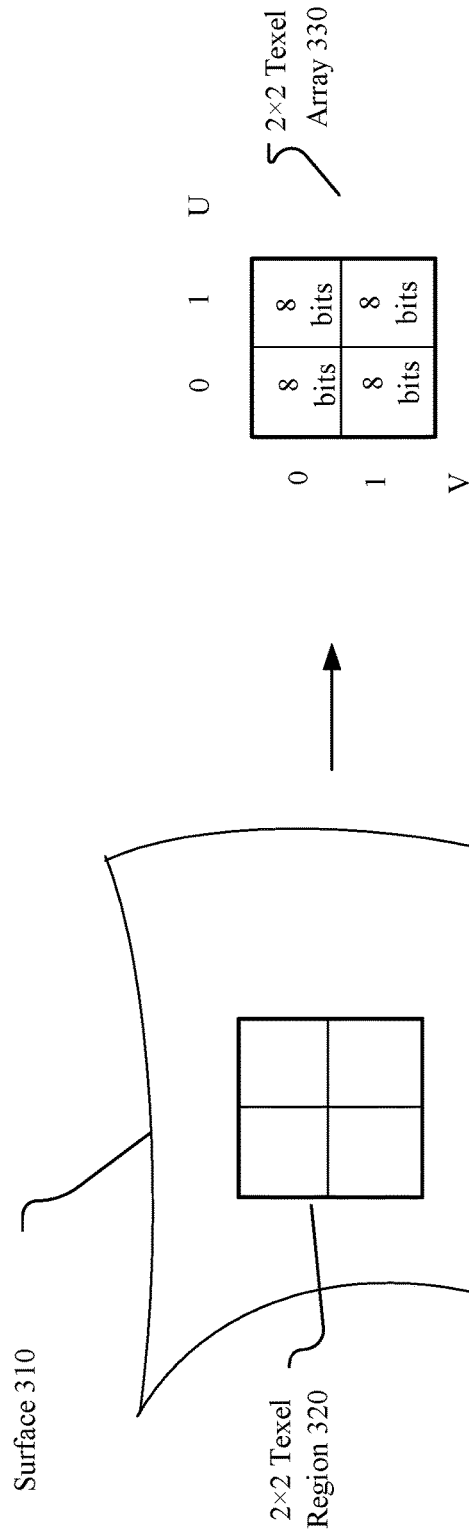
FIGS. 3A-3B illustrate an example 2×2 texel array stored in two 32 bytes memory blocks in traditional way.
Figure 3B:
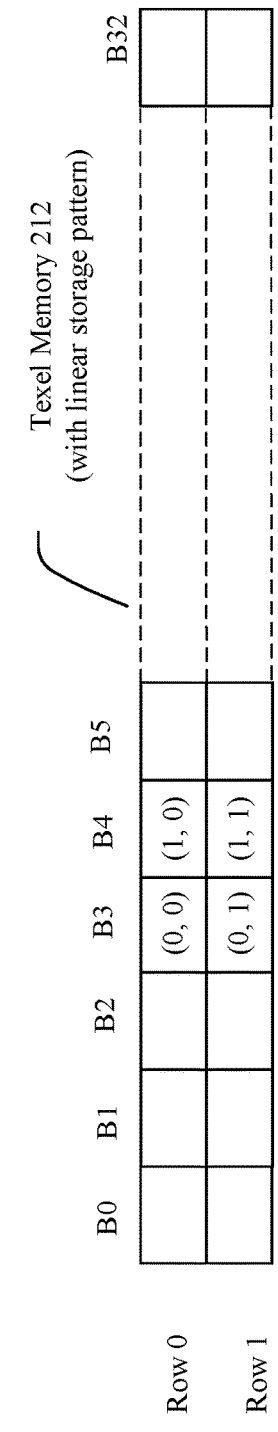

A naïve storage of texels without using swizzle patterns may yield suboptimal performance. FIGS. 3A-3B illustrate an example 2×2 texel array stored in two 32 bytes memory blocks without using swizzle patterns. The 2×2 texel array 330 may include four 8-bit texels corresponding to a 2×2 texel region 320 associated with a surface 310. The texels associated with the surface 310 may be stored in the texel memory 212 by linearly mapping the texel position to the address space of texel memory 212. For example, the 2×2 texel array 330 may be stored in the texel memory 212 (together with other texels associated with the surface 310) with a linear pattern in which the texel at location (0, 0) in the texel array 330 is stored in texel memory 212 at (Row 0, B3), the texel (1, 0) is stored in texel memory 212 at (Row 0, B4), the texel (0, 1) is stored in texel memory 212 at (Row 1, B3), and the texel (1, 1) is stored in texel memory 212 at (Row 1, B4). Each row of the texel memory 212 may correspond to a 256-bit memory unit which can be read out using one read operation. When the texel array 330 is needed (e.g., for interpolation), the traditional artificial reality systems need two read operations to read the first and second row of the texel memory 212, respectively. Then the systems need to select two texels (0, 0) and (1, 0) from the first 256-bit data read from the Row 0 of the texel memory 212 and select the other two texels (0, 1) and (1, 1) from the second 256-bit data read from Row 1 of the texel memory 212, and assemble the four selected pixels into a 2×2 texel array. These processes have many wasted reading. For example, two read operations are needed to read two 256-bit (32 bytes) memory row, but only two bytes out of each 32 bytes are useful data, which means that the system resources (e.g., bandwidth, power, etc.) used for reading the other bits of data are wasted. Therefore, these processes lead to unnecessary excess multiplexing on memory data bus and lead to inefficient memory reading. Such shortcomings are overcome by storing the texels in swizzle patterns described below.

In particular embodiments, the aforementioned transform block may sample surfaces using projected tile. In particular embodiments, rays may be cast for each pixel in the screen. This, however, may not be computationally efficient, since a scene with sparse surfaces may result in many rays not intersecting anything. Thus, in particular embodiments, the ray caster may instead cast ray bundles or beams from a collection of pixels into the scene so that larger sampling footprints may be examined at once. Conceptually, if a ray bundle does not intersect any surface, then any ray within the bundle would not intersect any surface either. Based on this observation, once it is determined that a ray bundle does not intersect a surface, no further processing needs to be performed against that surface for the pixels from which the ray bundle is cast. If, on the other hand, the ray bundle intersects the surface, then the ray caster may perform finer sampling for each pixel associated with the ray bundle. In particular embodiments, ray bundles may be cast from units of pixel collections. For example, a unit of aligned pixels from which a ray bundle is cast may be referred to herein as "tile." For example, each tile may be an aligned block of 16×16 pixels of the screen. The position of a tile may be specified based on any appropriate scheme, such as by specifying the four corners of the tile, a center point and distance to the edges, a mathematical equation, any other suitable method, or any combination thereof. In particular embodiments, the ray bundle that is cast from a tile may be defined by four rays that are cast from the four corners of the tile. Thus, a ray's position may be specified in the pixel coordinate space of the screen (e.g., the (x, y) pixel position within the screen space of the particular display, such as the left-eye or right-eye display, associated with the transform block).

When the four corners of a ray bundle intersect a surface, the points of intersections may be transformed from the 3D view space coordinate system into the 2D texture space coordinate system (e.g., specified in (u, v)). Those four sampling points in texture space may be referred as a projected tile. When the pixel block determines the color for each pixel sample within the projected tile, the size of the projected tile may be used to select a suitable texture resolution (e.g., from a mipmap) such that each texel within the selected texture is approximately the size of each pixel within the projected tile (e.g., the distance between two pixel samples within the projected tile is no more than 2 texels apart).

To ensure that the texels needed for determining the colors for 2×2 pixel sample locations are within their surrounding block of 4×4 texels, particular embodiments of the display engine may limit the amount of allowed zoom out. When the viewer zooms out, a surface associated with a rendered object may become smaller in size relative to the screen because of the minification effect. When the minified surface is sampled by the same sample locations, the sample locations may cover more texels on the minified surface (in other words, the distance, measured in texels, between sample locations would increase). Consequently, the system may need to access and interpolate more texels beyond the 4×4 block of texels 4 to determine the four pixel values. Therefore, sampling a minified surface by zooming out operation could be expensive with respect to computational resources, memory access, and power consumption. In particular embodiments, the system may restrict the minification effect for zooming out operations to be within a two-time range, and therefore allow the 2×2 pixel sampling points to always fall within a 4×4 texel region. In particular embodiments, the system may store the 4×4 texel region in a memory unit (e.g., 32-byte memory unit) which could be readout in one read operation, and therefore allows the 4×4 texels to be retrieved from memory in parallel.

To optimize texel memory reads, particular embodiments of the display engine may convert the input stream data into arrays of texels with required formats and store the texel arrays in texel memory using a 2D swizzle pattern. The swizzle pattern may be used to optimize texel memory access by storing a 2D texel array (e.g., 4×4 16-bit texel array, 8×4 8-bit texel array) into a memory unit (e.g., 32-byte memory unit) that can be read out using one read operation. For example, all texels in a 4×4 texel array that is read out from a 32-byte memory unit may be useful texel data needed for interpolation. This is a significant improvement over the wasted readings in traditional read operations where only a portion of the data read is useful and other data is wasted. In particular embodiments, the storage format used in the texel memory may be designed to support 4×4 texels accesses and to minimize the amount of multiplexing required to support multiple formats. In particular embodiments, the swizzle patterns may ensure that each 256-bit memory read can be divided into 16 16-bit values, each of which may always provide data for just one of the 16 texel buffers. This eliminates multiplexing when connecting the texel memory read bus to the texel buffers. In particular embodiments, the system may support multiple texel sizes, for example, 8-bit, 16-bit, 32-bit, etc. By using the swizzle pattern, particular embodiments of the system minimize the amount of multiplexing required to support multiple formats of texel data, provide faster memory reading to retrieve the texels that are need for interpolation, and reduce power consumption and operation logic usage for retrieving texels from memory.

Figures 4A, 4B, 4C, 4D:
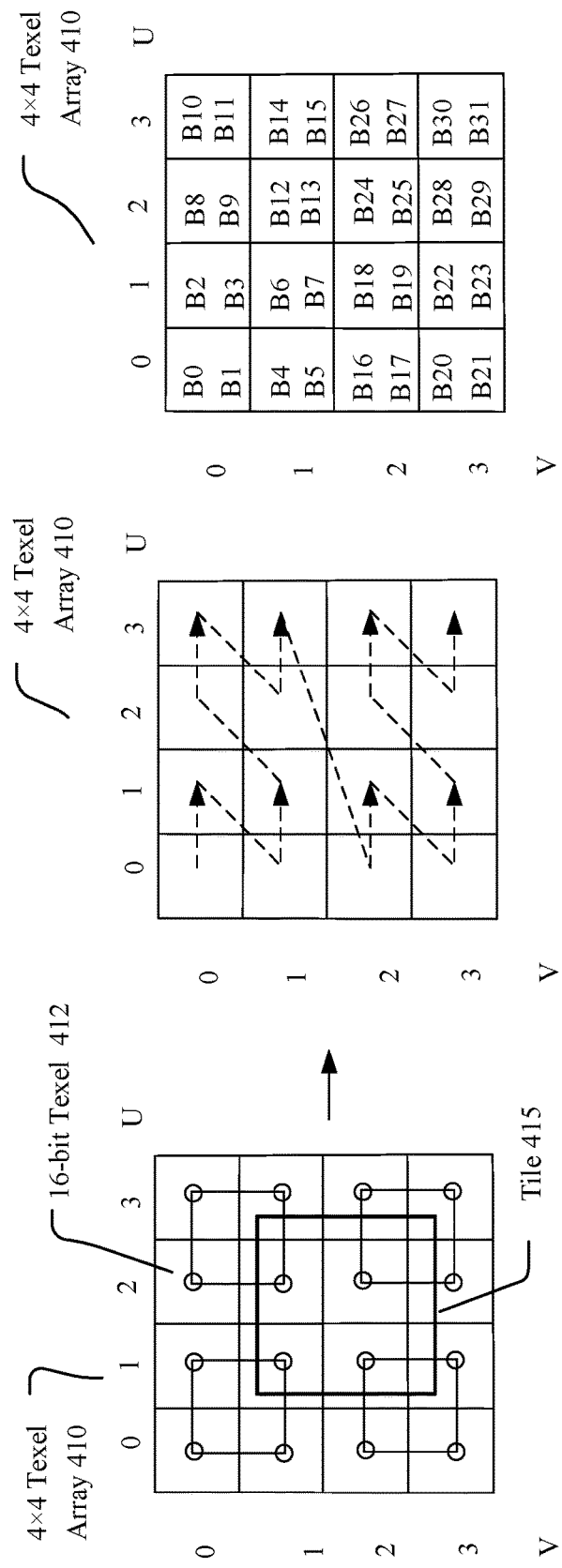
FIGS. 4A-4D illustrate an example 4×4 16-bit texel array stored in a 32-byte memory unit with a swizzle pattern.

FIGS. 4A-4D illustrate an example 4×4 16-bit texel array 410 stored in a 32-byte memory unit 420 with a swizzle pattern. In particular embodiments, the system may store a 2D texel array in a memory unit with a swizzle pattern to allow all the texels in the 2D texel array to be retrieved parallelly from memory using one read operation. As an example and not by way of limitation, the 4×4 texel array 410, as illustrated in FIG. 4A, may include 16 texels as indicated by the (u, v) coordinates and each texel may have 16-bit data. The 16 texels in the texel array 410 may be needed to determine the color of all pixels associated with the sample region 415 (e.g., the four pixel sample locations at the corners of the region 415), and therefore may be needed at the same time during the sampling process. Parallelly retrieving the 16 texels in the 4×4 texel array 410 may result in faster sampling process and improve system efficiency.

In particular embodiments, the 4×4 texel array 410 may be stored in the same memory unit, for example, a 32-byte (256 bits) memory unit 420 using a swizzle pattern which is the same or similar to the pattern as illustrated in FIG. 4D. To generate the swizzle pattern, the system may generate the addresses for the texels based on a number of rules which map the texels to corresponding memory space locations. In particular embodiments, the rules may include a specified order in the (U, V) coordinate space of the texels. As an example and not by way of limitation, for a 2×2 texel array in the (U, V) coordinate space, the swizzle order may be described as (0, 0), (1, 0), (0, 1), (1, 1), as illustrated in FIG. 4B. To generate this particular order, the V coordinate may be firstly kept constant at 0 when the U coordinate increases from 0 to 1, and then the V coordinate may be kept constant at 1 when the U coordinate increase from 0 to 1. The (U, V) coordinates used to define this order may be within a local (U, V) coordinate space which is defined using the texel at the upper-left corner of the 2×2 texel array as the reference texel (0, 0), rather than using the overall (U, V) coordinates for all 16 texels. Therefore, the four texels in each 2×2 texel array may be ordered in this particular order regardless the actual position of the 2×2 texel array in the overall larger texel region. It is notable that this particular order within a 2×2 texel array is only an example and the order of the texels in a 2×2 texel array is not limited to this order. In particular embodiments, the system may use other orders for the texels within a 2×2 texel array, for example, the order of (0, 0), (0, 1), (1, 0), (1, 1) or any possible order for four texels. In particular embodiments, the system may support any possible orders for ordering texels within a 2×2 texel array as along as the four texels in the 2×2 texel array are mapped to the memory address space (e.g., 8-byte memory space for 8-bit texel format). The 2×2 texel array may be stored in the corresponding memory space of the memory unit with a swizzle pattern as defined by the mapping between the texels and memory space.

FIG. 4B illustrates an example order for mapping a 4×4 16-bit texel array to memory address space of a 32-byte memory unit. In particular embodiments, the system may conceptually divide a 4×4 texel array into four aligned 2×2 texel arrays based on their relative positions. For example, the 4×4 texel array may be conceptually divided into four 2×2 texel arrays, each of which may occupy a corner 2×2 texel region of the 4×4 texel array. In particular embodiments, each of the four 2×2 texel arrays may be accessed in an order that is similar to the swizzle order within a 2×2 texel array. For example, the four 2×2 texel arrays may be accessed in the order of upper-left, upper-right, lower-left, and lower-right. During that process, each 2×2 texel array may be accessed in the swizzle order as described above. As a result, the 16 texels in the 4×4 texel array may be ordered in a pattern that is the same or similar to the pattern as illustrated in FIG. 4B. The 16 texels may be directly mapped to the memory address space (e.g., B0 to B31) of a 32-byte memory unit 420. Since each texel has 16-bits data in this example, each texel may correspond to a two-byte memory space. FIG. 4C illustrates example byte addresses for the texels in the 4×4 texel array 410. For example, the texel at (0, 0) is stored in byte addresses B0 and B1, the texel at (1, 0) is stored in byte addresses B2 and B3, and so on. FIG. 4D illustrates an example swizzle pattern in which the 4×4 16-bit texel array is stored in the 32-byte memory unit 420. When the 4×4 texel array 410 is needed, the system may access the 32-byte (256 bits) memory unit 420 using one read operation to retrieve all the 16 texels parallelly.

FIGS. 5A-5D illustrate an example of two 2×2 8-bit texel arrays stored in an 8-byte memory unit with an interleaved swizzle pattern. In particular embodiments, the system may support texels with different bit lengths including, for example, but not limited to, 8 bits, 16 bits, 32 bits, etc. In particular embodiments, the method and rules for mapping and storing the 4×4 16-bit texel arrays into 32-byte memory units may apply to texels with all possible bit lengths (e.g., 8 bits, 16 bits, 32 bits). In particular embodiments, the 32-byte memory unit may be divided into four 8-byte memory units and each 8-byte memory unit may store two 2×2 texel arrays with 8-bit texels using an interleaved swizzle pattern.

FIG. 5A illustrates an example of two 2×2 8-bit texel arrays 512 and 514 (within an 8×2 texel array 510) that are mapped to an 8-byte memory unit 520. In particular embodiments, the four texels in the 2×2 texel array 512 and the four texels in the 2×2 texel array 514 may be mapped to an 8-byte memory unit's address space (byte B0 to byte B7). It is notable that this particular order is only an example and the order of the texels of a 2×2 texel array is not limited to this order. In particular embodiments, the four texels of a 2×2 texel array may be ordered using any possible order as long as the same order is used for all other 2×2 texel arrays. Since an 8-byte memory unit could contain two 2×2 texel arrays with 8-bit texels, particular embodiments of the system may map two 2×2 texel arrays into the 8-byte memory unit in an interleaved manager.

FIG. 5B illustrates an example texel order interleaving two 2×2 8-bit texel arrays 512 and 514. The interleaving order may traverse each texel in the texel array 512 in a swizzle pattern (e.g., (0,0), (1,0), (0,1), (1,1)), but after each texel (u, v) of the texel array 512, an interleaving texel located at (u+4, v) may be inserted from texel array 514. For example, the texel of the 2×2 texel array 512 may be ordered in an order of (0, 0), (1, 0), (0, 1), (1, 1) with respect to the texels of the same array 512. Using the interleaving rules as described above, the texel order of the two interleaved 2×2 texel arrays may be (0, 0), (4, 0), (1, 0), (5, 0), (0, 1), (4, 1) (1, 1), (5, 1). In other words, the texel order of the two interleaved 2×2 texel arrays may be described by (u+0, v+0), (u+4, v+0), (u+1, v+0), (u+5, v+0), (u+0, v+1), (u+4, v+1), (u+1, v+1), (u+5, v+1) with respect to a reference texel (u, v), which is the texel (0, 0) for the 2×2 texel array 512. The ordered texels may be mapped to the address space (B0 to B7) of the 8-byte memory unit 520. FIG. 5C illustrates example texel addresses that map the two 2×2 8-bit texel arrays 512 and 514 into the 8-byte memory unit 520 in the interleaved swizzle pattern. FIG. 5D illustrates example texels that are stored in the 8-bit memory unit 520 using the interleaved swizzle pattern.

FIGS. 5E-5F illustrate an example 8×4 8-bit texel array 530 stored in a 32-byte memory unit 540 in an interleaved swizzle pattern. The 8×4 texel array may be divided into eight 2×2 texel arrays 531, 532, 533, 534, 535, 536, 537, 538. Using the method for mapping two 2×2 texel arrays into an 8-byte memory unit, the eight 2×2 texel array may be grouped into four pairs, with each pair including two 2×2 texel arrays to be interleaved. The four pair of 2×2 texel arrays may include, for example, (531, 533), (532, 534), (535, 537), and (536, 538) and may be mapped to the 32-byte memory unit 540 by interleaving each pair of 2×2 texel arrays. FIG. 5F illustrates example texel addresses for the 8×4 texel array. FIG. 5G illustrates example 2×2 texel array pairs stored in the 32-byte memory unit in the interleaved swizzle pattern.

FIGS. 6A-6D illustrate an example 2×2 32-bit texel array 610 divided into two 2×2 16-bit texel arrays to be stored in 8-byte memory units (e.g., 620) in a swizzle pattern. FIG. 6A illustrates an example 2×2 32-bit texel array which corresponds to a 16-byte memory space. Therefore, the 8-byte memory unit 620 may store only half data of the 2×2 texel array 610. In particular embodiments, a 32-bit texel may be divided into a high half 16-bit texel data and a low half 16-bit texel data, as will be illustrated in later FIG. 10. A 2×2 texel array with 32-bit texels may be divided into two 2×2 texel arrays, with each storing 2×2 half 32-bit (i.e., 16-bit) texels. A 2×2 texel array with half 32-bit texels may be stored in an 8-byte memory unit. FIG. 6B illustrates two example 2×2 texel arrays, each of which stores half 32-bit texels corresponding the 32-bit texels in the 2×2 texel array 610. For example, the 2×2 texel array 612 may store four 16-bit texel data corresponding to the high half of the respective 32-bit texels in the 2×2 texel array 610. The 2×2 texel array 614 may store four 16-bit texel data corresponding to the low half of the respective 32-bit texels in the 2×2 texel array of 610. FIG. 6C illustrates an example order to map 2×2 texel array 612 into an 8-byte memory unit 620. FIG. 6D illustrates example addresses for the half 32-bit texel data in the 2×2 texel array 612. FIG. 6E illustrates an example swizzle pattern by which the half 32-bit texels in the 2×2 texel array 612 or 614 are stored in the 8-bit memory unit 620.

FIGS. 6F-6G illustrate an example 4×4 32-bit texel array which is mapped to a 64-byte memory unit 640 in a swizzle pattern. FIG. 6F illustrates example addresses for the respective high and low halves of 32-bit texels in the 4×4 texel array 630. Each 32-bit texel may be corresponding to two addresses which are within two respective 32-byte memory units (e.g., a first 32-byte memory unit corresponding to address space from B0 to B31, a second 32-byte memory unit corresponding to address space from B32 to B63). For example, the high half of the texel (0, 0) may correspond to a first address B<1:0> and the low half of the texel (0,0) may correspond to a second address B<33:32>. Similarly, all 32-bit texels in the 4×4 texel array 630 may be mapped to the 64-bit memory unit 640, as illustrated in the 6G.

Figure 7:
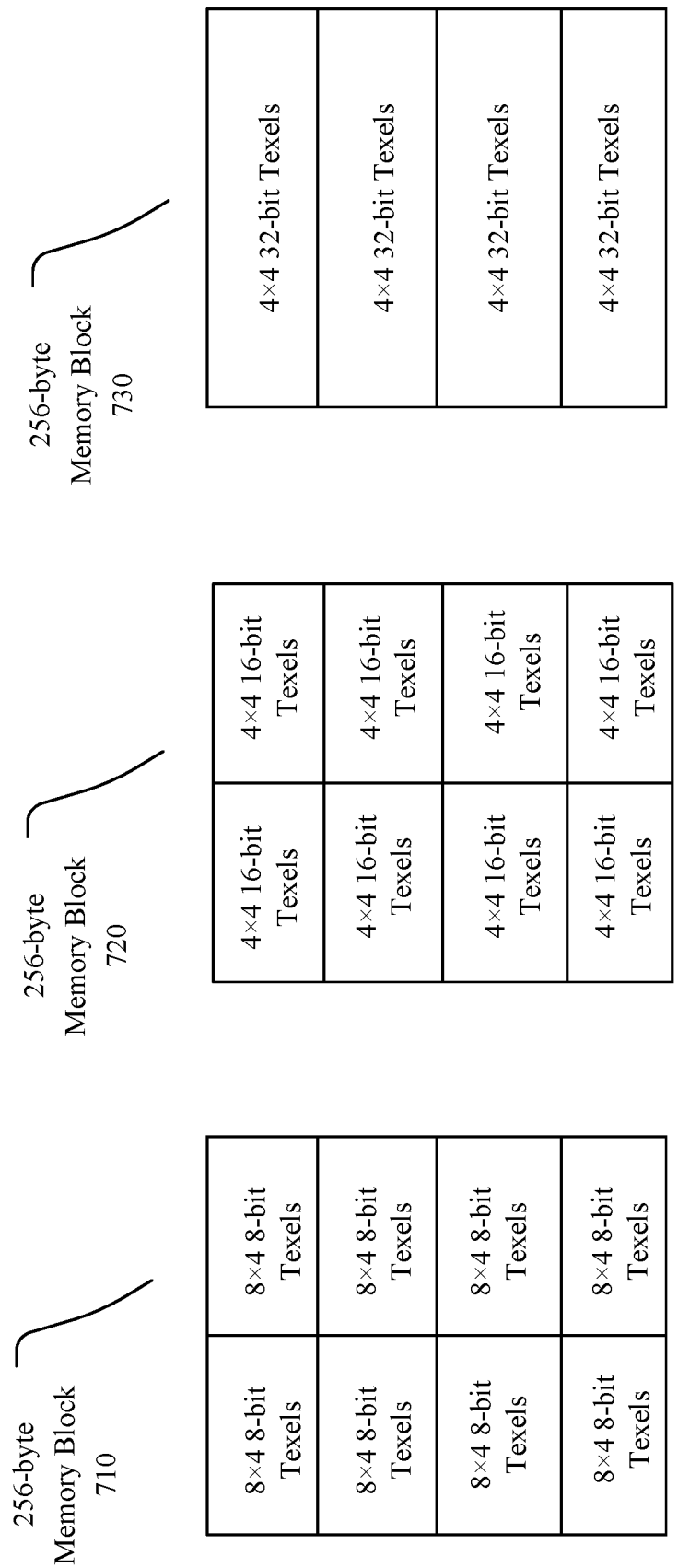
FIG. 7 illustrates example 256-byte memory blocks (e.g., 710, 720, 730) for storing 8-bit texels, 16-bit texels, and 32-bit texels, respectively.

FIG. 7 illustrates example 256-byte memory blocks (e.g., 710, 720, 730) for storing 8-bit texels, 16-bit texels, and 32-bit texels, respectively. In particular embodiments, the system may store a 4×4 texel array into a 32-byte memory unit using the processes as described above. The texels in each 4×4 texel array may be 8-bit texel, 16-bit texels, 32-bit texels, or texels with any other suitable bit lengths. In particular embodiments, the system may combine four 32-byte memory units into larger memory block, for example, 256-byte memory block, by stacking the four 32-byte memory units linearly, as illustrated in FIG. 7. As an example and not by way of limitation, the 256-byte memory block 710 may include eight 8×4 8-bit texel arrays, each of which may correspond to a 32-byte memory space. The eight 8×4 8-bit texel arrays may be stacked linearly. As another example, the 256-byte memory block 720 may include eight 4×4 16-bit texel array each of which may correspond to a 32-byte memory space. The eight 4×4 texel arrays may be stacked linearly. As another example, the 256-byte memory block 730 may include four 4×4 32-bit texel arrays each of which may correspond to a 64-byte memory unit. The four 4×4 32-bit texel arrays may be stacked linearly.

Figure 8:
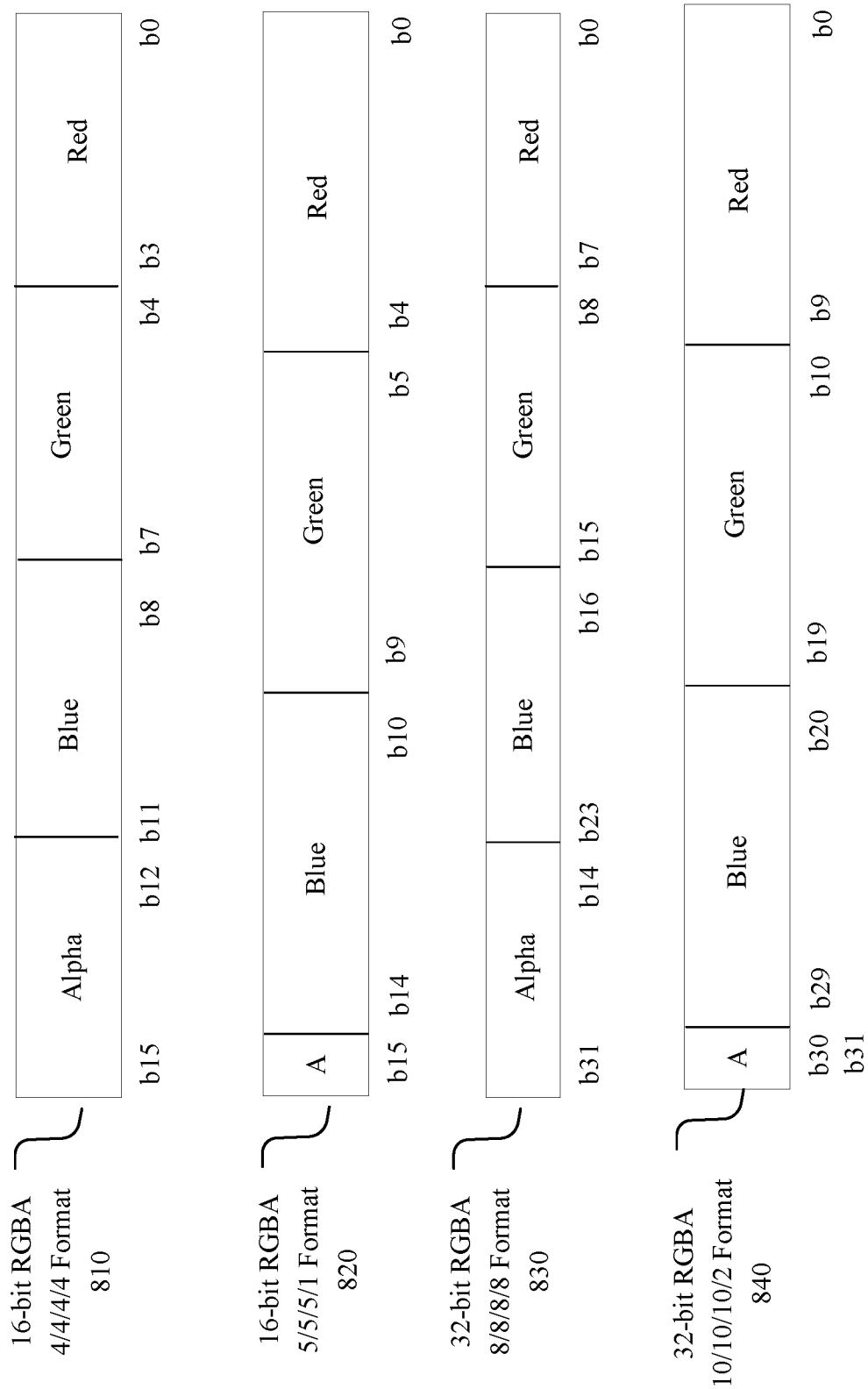
FIG. 8 illustrates four example RGBA texel data formats that are supported by the display engine

FIG. 8 illustrates four example RGBA texel data formats that are supported by the display engine. In particular embodiments, the system may support a variety of standard formats for images and alpha masks, as well as non-standard formats for labels, which may store distance and color index. In particular embodiments, the system may support images in the RGBA formats, for example, but not limited to, 16-bit RGBA 4/4/4/4 format 810, 16-bit RGBA 5/5/5/1 format 820, 32-bit RGBA 8/8/8/8 format 830, 32-bit RGBA 10/10/10/2 format 840, etc. For example, the 16-bit RGBS 4/4/4/4 format 810 may have red, green, blue, and alpha components each corresponding to a 4-bit data space. As another example, the 16-bit RGBA 5/5/5/1 format 820 may have red, green, blue component each corresponding to a 5-bit data space and the alpha corresponding to 1-bit space. As another example, the 32-bit RGBA 8/8/8/8 format 830 may have red, green, blue, alpha components each corresponding to an 8-bit space. As another example, the 32-bit RGBA 10/10/10/2 format 840 may have red, green, and blue component each corresponding to a 10-bit space and have the alpha component corresponding to a 2-bit space. For all these formats, each format may have at least one bit for alpha to specify transparent pixels and opaque pixels. In particular embodiments, the red, green, blue and alpha components of the texels may be stored as normalized linear light values or as sRGB encoded values. The normalized numbers may be values in the range of [0, 1] and sRGB encoded numbers may use perceptually equal steps instead of physically equal steps. In particular embodiments, the system may include a key requirement for image formats in which red, green, and blue values may use pre-multiplied alpha. In other words, each color value may be multiplied by its alpha value before being sent to headset system. As a result, if alpha equal to zero, all three of the color components may be zero as well.

Figure 9:
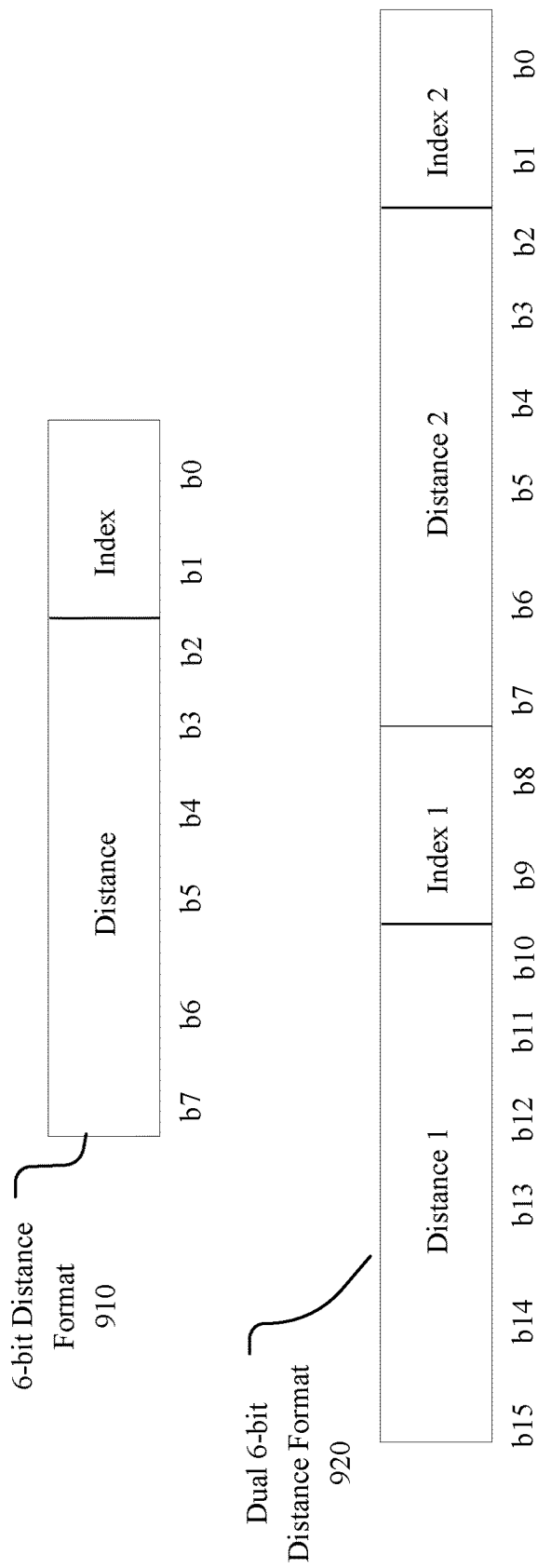
FIG. 9 illustrates example texel formats for distance field and color index.

FIG. 9 illustrates example texel formats for distance field and color index. In particular embodiments, the system may use a texel format including bits for distance field and color index. The distance fields may be used to represent the edges between solid-color regions in labels. Each texel may store a representation of the distance to the nearest edge, bounded by some maximum distance. A value 1 in the high order bit may indicate that the texel is outside the region defined by the edge and a value 0 in the high order bit may indicate that the texel is inside the region defined by the edge. Bilinearly interpolating these numbers may result in a most significant bit (MSB) that specifies which side of the edge the sample position is on. The color index may be used to select colors from a color table. The distance field bits together with the color index bits may determine the color at each pixel. In particular embodiments, the system may use a 6-bit distance format 910 which may include one 6-bit distance and one 2-bit color index in an 8-bit texel data. In particular embodiments, the system may use a dual 6-bit distance format 920 which may include a pair of 6-bit distances (e.g., distance 1 and distance 2) and a pair of color indices (e.g., index 1 and index 2) in a 16-bit texel data.

Figure 10:
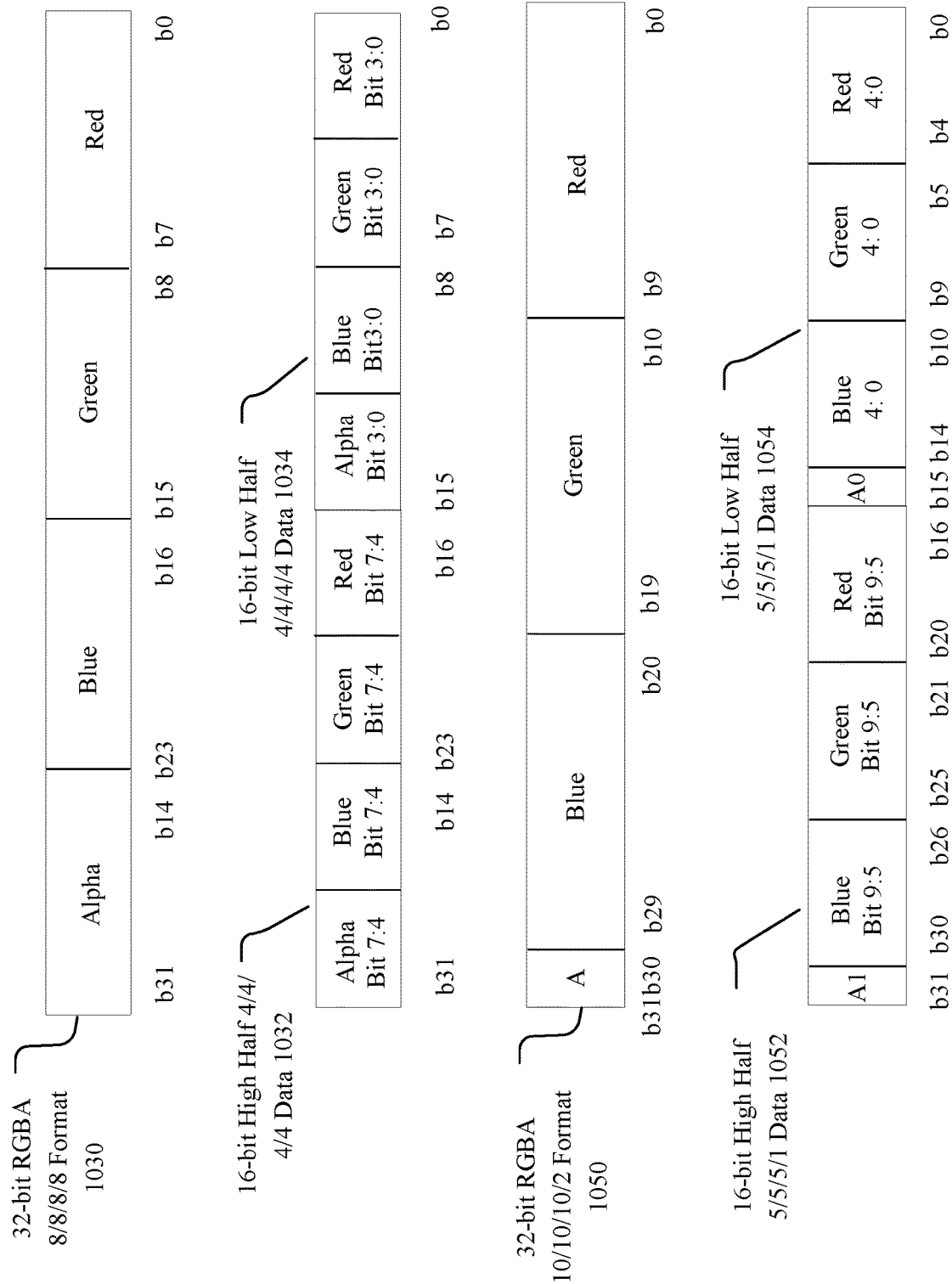
FIG. 10 illustrates example 32-bit RGBA formats that are split into two half 16-bite RGBA texel data.

FIG. 10 illustrates example 32-bit RGBA formats that are split into two half 16-bit RGBA texel data. In particular embodiments, the system may support 32-bit texel formats. A 4×4 32-bit texel array corresponding to a 64-byte memory space cannot fit into a 32-byte memory unit. In particular embodiments, the system may divide each 32-bit texel data into a low half and a high half texel data each having 16-bits. In particular embodiments, the components of red, green, blue, and alpha may each be split into a low half and a high half. For example, a texel with the 32-bit RGBA 8/8/8/8 format 1030 may be divvied into two 4/4/4/4 halves. The 16-bit high half 4/4/4/4 data 1032 may include four components of red, green, blue, and alpha and each component may include four bits corresponding to the four high bits (bit 7~bit 4) of the corresponding component in the 32-bit RGBA format 1030. Similarly, the 16-bit low half 4/4/4/4 data 1034 may include four components of red, green, blue, and alpha and each component may include four bits corresponding to the four low bits (bit 3~bit 0) of the corresponding component in the 32-bit RGBA formant 1030. As another example, a texel with the 32-bit RBGA 10/10/10/2 format 1050 may be divided into a high half 5/5/5/1 texel data and a low half 5/5/5/1 texel data. Each half texel data may contain the respective low or high half bits of each component. For example, the 16-bit high half 5/5/5/1 data 1052 may include red, green, and blue components and each component may include five bits corresponding to the five high bits (bit 9~bit 5) of the corresponding color component in the 32-bit RGBA 10/10/10/2 format 1050. Similarly, the 16-bit low half 5/5/5/1 data 1054 may include red, green, and blue components and each component may include five bits corresponding to the five low bits (bit 4~bit 0) of the corresponding color component in the 32-bit RGBA 10/10/10/2 format 1050. The alpha components of the high half and low half 5/5/5/1 data 1502 and 1504 may, respectively, include the high bit (bit 1) and the low bit (bit 0) of the alpha component in the 32-bit RGBA 10/10/10/2 formant 1050. In particular embodiments, these layouts make it simpler for the pixel blocks to convert the split format back to the original RGBA formats (e.g., RGBA 4/4/4/4 format to RGBA 8/8/8/8 format, RGBA 5/5/5/1 to RGBA 10/10/10/2) for later processing, and therefore improve the system performance.

In particular embodiments, the 32-bit texels that are stored using the swizzle pattern may be loaded in two stages or two reading cycles, each of which may load half of the 32-bit pixel. For example, the low 16 bits of each 32-bit pixel may be loaded in one cycle and the high 16 bits of each 32-bit pixel may be loaded in a second cycle. Then, the low 16-bit and the high 16 bits may be merged into a single texel. In particular embodiments, the 32-bit texels may be divided into a high 16-bit texel and a low 16-bit texel in a way that allows the high half 16-bit texel to include the high bits (e.g., bit 7:4, bit 9:5) of each component (e.g., red, green, blue, alpha) and allows the low half 16-bit texel to include the low bits (e.g., bit 3:0, bit 4:0) of each component (e.g., red, green, blue, alpha), as described in FIG. 10. When the two half 16-bit texel data are loaded (e.g., in two reading cycles), the two cycles needed to load a 32-bit pixel may contain the low and high halves of each individual RGBA component. This significantly simplifies the loading process of 32-bit texels. For example, a 16-bit texel with the 4/4/4/4 RBGA format, may be converted to an 8/8/8/8 texel by replicating each of the RGBA components. As another example, when loading a 32-bit texel with an 8/8/8/8 RBGA format, the lower and higher halves of the 8-bit components may be loaded separately, instead of both being loaded from a single cycle as for a texel with the 4/4/4/4 RGBA format. Similarly, a 16-bit texel with a 5/5/5/1 RBGA format may be converted to a 10/10/10/2 texel before further processing by replicating the bits of each RGBA component. A 32-bit texel with a 10/10/10/2 RGBA format may load the higher and lower halves of the 10-bit or 2-bit in the two cycles used to transfer the 32-bit texel. As a result, subsequent logic needs to support only two formats instead of four separate formats, and therefore significantly reducing the complexity of the system in subsequent logic.

Figure 11A:
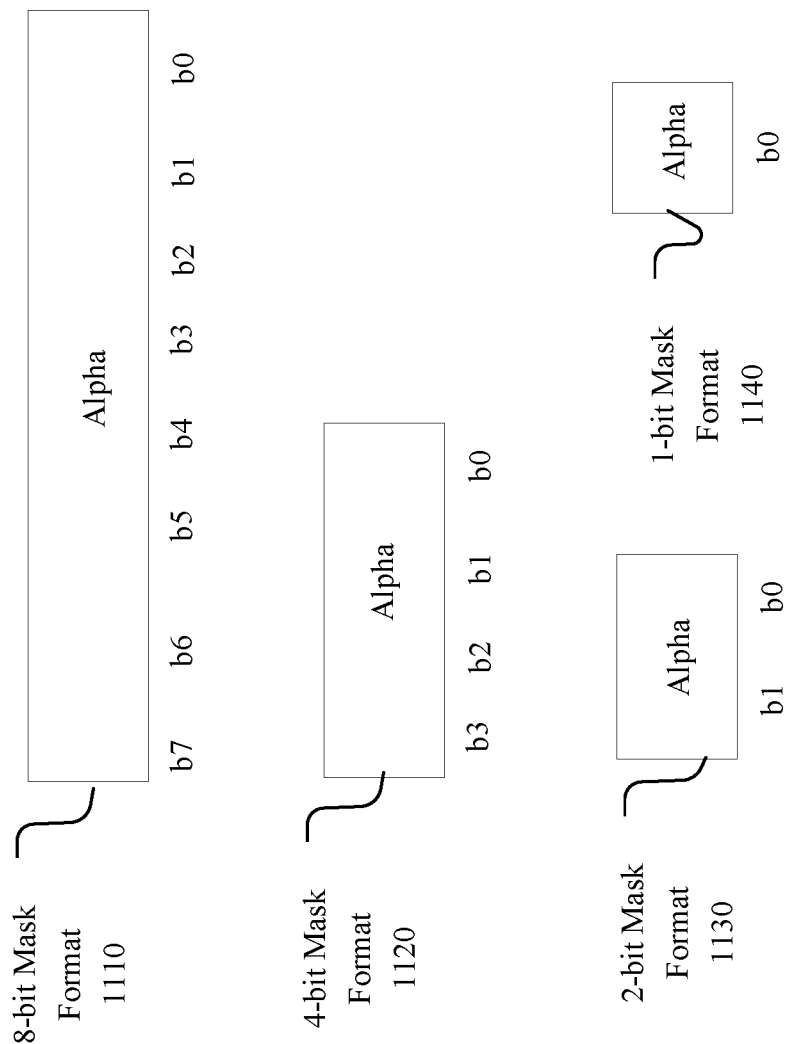
FIG. 11A illustrates example mask formats that are supported by the system.

FIG. 11A illustrates example mask formats (e.g., 1110, 1120, 1130) that are supported by the system. In particular embodiments, the system may support single-channel mask formats that store only an alpha value for one or more surfaces. In particular embodiments, masks may be associated with an alpha channel that specifies an occlusion mask. These masks may be used to mask out surface data that is occluded by some object. For example, the system may use such masks to mask out a label that is attached to a wall when objects or people are between the viewer and that wall. In particular embodiments, the system may support an 8-bit alpha mask format 1110. In particular embodiments, the system may support sub-byte mask formats including, for example, but not limited to, 4-bit mask format 1120, 2-bit mask format 1130, 1-bit mask format 1140, etc.

Figure 11B:
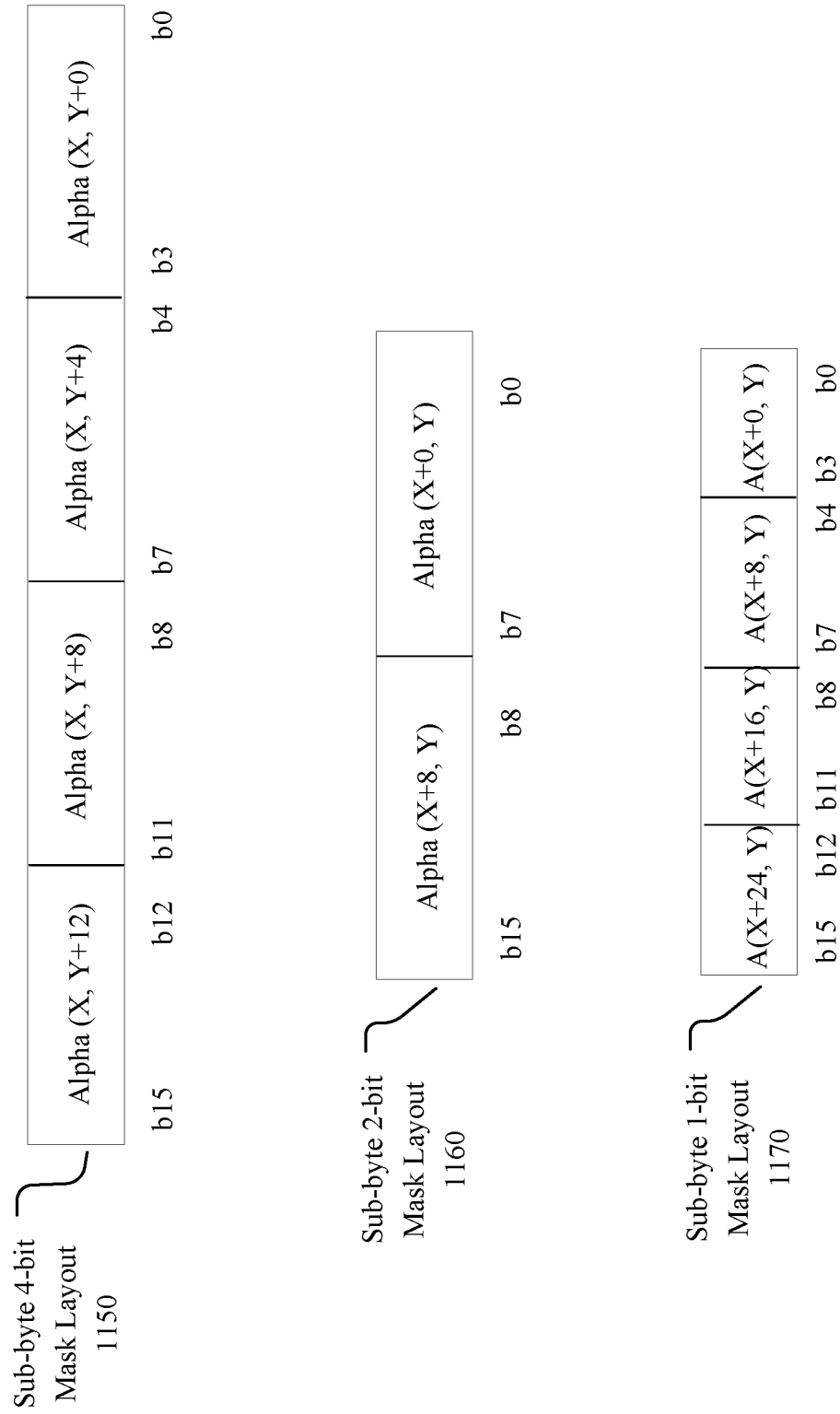
FIG. 11B illustrates example sub-type alpha masks which are stored by replicating each alpha mask.

FIG. 11B illustrates example sub-byte alpha masks which are stored by replicating each alpha mask. In particular embodiments, the 8-bit alpha mask may be stored into memory in a way that is the same or similar to the 8-bit texels. In particular embodiments, the sub-byte mask may be replicated to generate 16-bit masks which may be stored in 32-byte memory units in the same or similar way to the 16-bit texels. In particular embodiments, for sub-byte alpha mask formats, the sub-byte alpha mask may be stored by firstly replicating each alpha mask four times to produce a quad mask four times as wide. For example, the sub-byte 4-bit mask layout 1150 illustrates an example mask layout for replicating the initial alpha at (X, Y). The initial alpha (X, Y) may correspond to the lowest four bits (bit 3~bit 0) of the mask. The three replicated values may be stored at the bits of (bit 15~bit 12), (bit 11~b 8), (bit 7~bit 4) of the mask, respectively. The three replicated alpha values may have Y addresses corresponding to 4, 8, and 12 rows below the Y address of the initial mask. The three replicated alpha values and the initial alpha value may collectively form a 16-bit mask which can be stored in 32-byte memory units in a way similar or the same to the 16-bit texels. As a result, a 32-byte memory unit may store 16 16-bit masks in this format. For 2-bit and 1-bit masks, the system may pack 2 or 4 quad mask values to form a 16-bit mask. For example, for 2-bit masks, the extra quad mask values may have X addresses corresponding to 8 columns to the right of the first quad mask value. The extra quad mask values and the initial mask values may collectively form a 16-bit mask as shown in sub-byte 2-bit mask layout 1160. For 1-bit masks, four quad masks may be combined into a 16-bit mask at X addresses corresponding to 8, 16, and 24 columns to the right of the X address of the first quad mask, as shown in the sub-byte 1-bit mask layout 1170. As a result, a 32-byte memory unit may store 16×16 1-bit masks, 8×16 2-bit masks, or 4×16 4-bit masks.

In particular embodiments, the system may support different texel sizes, for example, but not limited to, 32-bit texel, 16-bit texel, 8-bit texel, 4-bit texel, 2-bit texel, 1-bit texel, etc. Table 1 shows example interleaved address bits for storing texels of different sizes in 32-byte memory units. In Table 1, $T_N$ may represent byte address bits to access a byte space in texel memory; $B_N$ represents bits of the byte address for multi-byte pixels, and $b_0$ may represent bit addresses within a byte. In particular embodiments, the system may include 8 logic banks which could be selected using a 3-bit address. The memory space in each logic banks may be divided to 32-byte memory units each of which may be used to store a 4×4 texel array, as described earlier in this disclosure. A 32-byte memory unit may correspond to a 5-bit address space and may be addressed by a 5-bit byte address for accessing each byte in the 32-byte memory.

TABLE 1

| Texel size | Bank Select | | | 256-bit Word Select | | | | | Bit Select | | | Unit size |
|---|---|---|---|---|---|---|---|---|---|---|---|---|
| | T7 | T6 | T5 | T4 | T3 | T2 | T1 | T0 | t2 | t1 | t0 | |
| 32-bit | Y3 | Y2 | B1 | Y1 | X1 | Y0 | X0 | B0 | b2 | b1 | b0 | 4 × 4 in 2 units |
| 16-bit | Y3 | Y2 | X2 | Y1 | X1 | Y0 | X0 | B0 | b2 | b1 | b0 | 4 × 4 in 1 unit |
| 8-bit | Y3 | Y2 | X3 | Y1 | X1 | Y0 | X0 | X2 | b2 | b1 | b0 | 8 × 4 in 1 unit |
| 4-bit | Y5 | Y4 | X2 | Y1 | X1 | Y0 | X0 | Y3 | Y2 | b1 | b0 | 4 × 16 in 1 unit |
| 2-bit | Y5 | Y4 | X3 | Y1 | X1 | Y0 | X0 | Y3 | Y2 | X2 | b0 | 8 × 16 in 1 unit |
| 1-bit | Y5 | Y4 | X4 | Y1 | X1 | Y0 | X0 | Y3 | Y2 | X3 | X2 | 16 × 16 in 1 unit |

In particular embodiments, the 8 bits byte address may use the higher three bits of $T_7$, $T_6$, $T_5$ for selecting a logic bank from 8 logic banks of the texel memory and may use the lower five bits $T_4$, $T_3$, $T_2$, $T_1$, $T_0$ to select a byte memory space from a 32-byte memory unit, as shown in Table 1. As an example and not by way of limitation, for a texel address of an 8-bit texel at a given (X, Y) coordinate, the lower 8-bits of the address (from MSB to LSB) may be described by $Y_3$ & $Y_2$ & $X_3$ & $Y_1$ & $X_1$ & $Y_0$ & $X_0$ & $X_2$, where "&" is a bit concatenation operator; $X_N$ and $Y_N$ represent bits of the (X, Y) pixel coordinate. As another example, for a texel address of a 16-bit texel at a given (X, Y) coordinate, the lower 8-bits of the address (from MSB to LSB) may be described by $Y_3$ & $Y_2$ & $X_2$ & $Y_1$ & $X_1$ & $Y_0$ & $X_0$ & $B_0$, where "&" is a bit concatenation operator; $X_N$ and $Y_N$ represent bits of the (X, Y) pixel coordinate. In particular embodiments, the system may use a 11-bit byte address to access each bit in the 32-byte memory unit. For example, the high 8 bits ($T_7$, $T_6$, $T_5$, $T_4$, $T_3$, $T_2$, $T_1$) may be used for accessing each byte within the 32-byte memory unit and the lowest 3 bits $t_1$, $t_2$, $t_3$ may be used to access each bit within a byte.

In particular embodiments, the system may organize texel memory using in 32-byte memory units. As shown in Table 1, a 32-byte memory unit may store texel arrays with different number of texels of different sizes. For example, for 32-bit texels, a 32-byte memory unit may store a 4×4 half texel array, and therefore a 4×4 32-bit texel array may need to be stored in two 32-byte memory units. As another example, a 32-byte memory unit may store a 4×4 texel array for 16-bit texels, an 8×4 texel array for 8-bit texels, a 4×16 texel array for 4-bit texels, an 8×16 texel array for 2-bit texels, or a 16×16 texel array for 1-bit texels.

In particular embodiments, the system may divide a memory unit with particular sizes into multiple rows. For example, each 256-byte memory unit may be divided into 16 rows, each 32-byte memory unit may be divided into 4 rows, and each 8-byte memory unit may be divided into 2 rows. Referring to 8-bit, 16-bit and 32-bit texels in Table 1, the texel address bits $T_4$ and $T_3$ may always map coordinates $Y_1$ and $X_1$, and texel address bits $T_2$ and $T_1$ may always map coordinates $Y_0$ and $X_0$. As a result, each 32-byte memory access may always cover an aligned 8-byte 4-row set of texels and each 8-byte memory access may always cover an aligned 4-byte 2-row set of texels. This allows each 256-bit texel read to use a fixed routing of its 16-bit sub-units to the 4×4 arrays of texel buffers in the pixel blocks. It also allows masking off 64-bit sub-words of a 256-bit read for the 4-byte 2-row that are not needed. In particular embodiments, higher order address bits may be generated by packing 256B units linearly in memory.

Figure 12A:
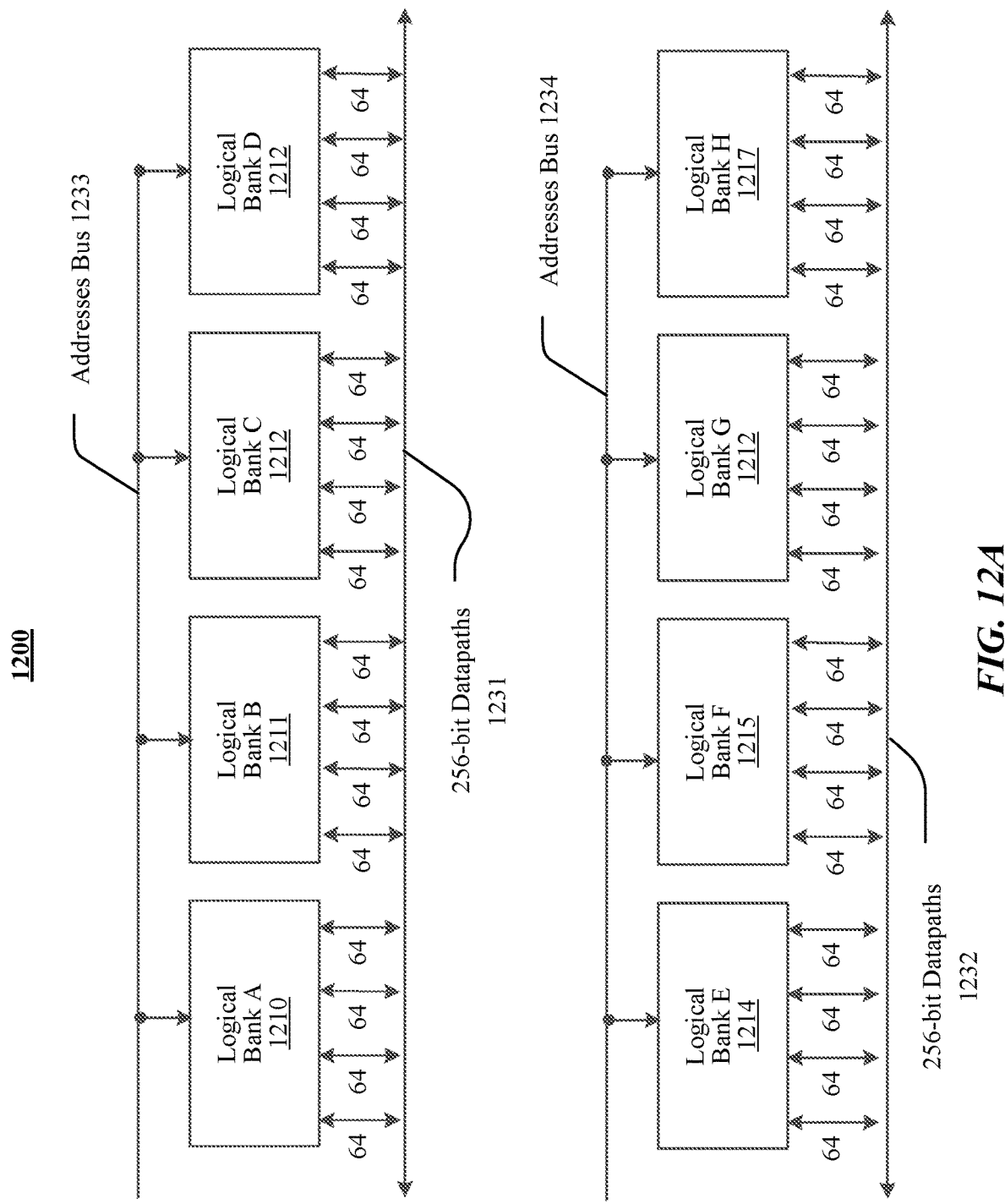
FIG. 12A illustrates an example diagram showing logic bank structure of texture memory.

FIG. 12A illustrates an example diagram 1200 showing logic bank structure of texture memory. In particular embodiments, the texel memory may support four memory requesters. The texture memory may be organized as eight independent 256-bit wide logical banks (e.g., 1210, 1211, 1213, 1214, 1215, 1216, 1217) which may be connected by 256-bit data buses (e.g., 1231, 1232). Each logic bank may be divided into four 64-bit wide sub-logic banks. This structure reduces power consumption that is needed for access the texture memory since unused 64-bit words on the 256-bit bus may not need to be read. Each of the sub-logic bank may be divided into 64 physical banks each of which may have 8 KB space, or a similar number of words as determined by microarchitectural tuning. This 64×8 KB physical bank structure reduces the power that is required to access the texture memory since address lines only need to be driven for the selected 8 KB word address range. The texture memory may allow the memory controller to arbitrate among stream in writing operations (which may have the highest priority), pixel block read operations, and accesses over the data bus (which may have the lowest priority). In particular embodiments, texel data may be stored using a pattern which is the same or similar to the pattern described in FIGS. 4A-4D.

Figure 12B:
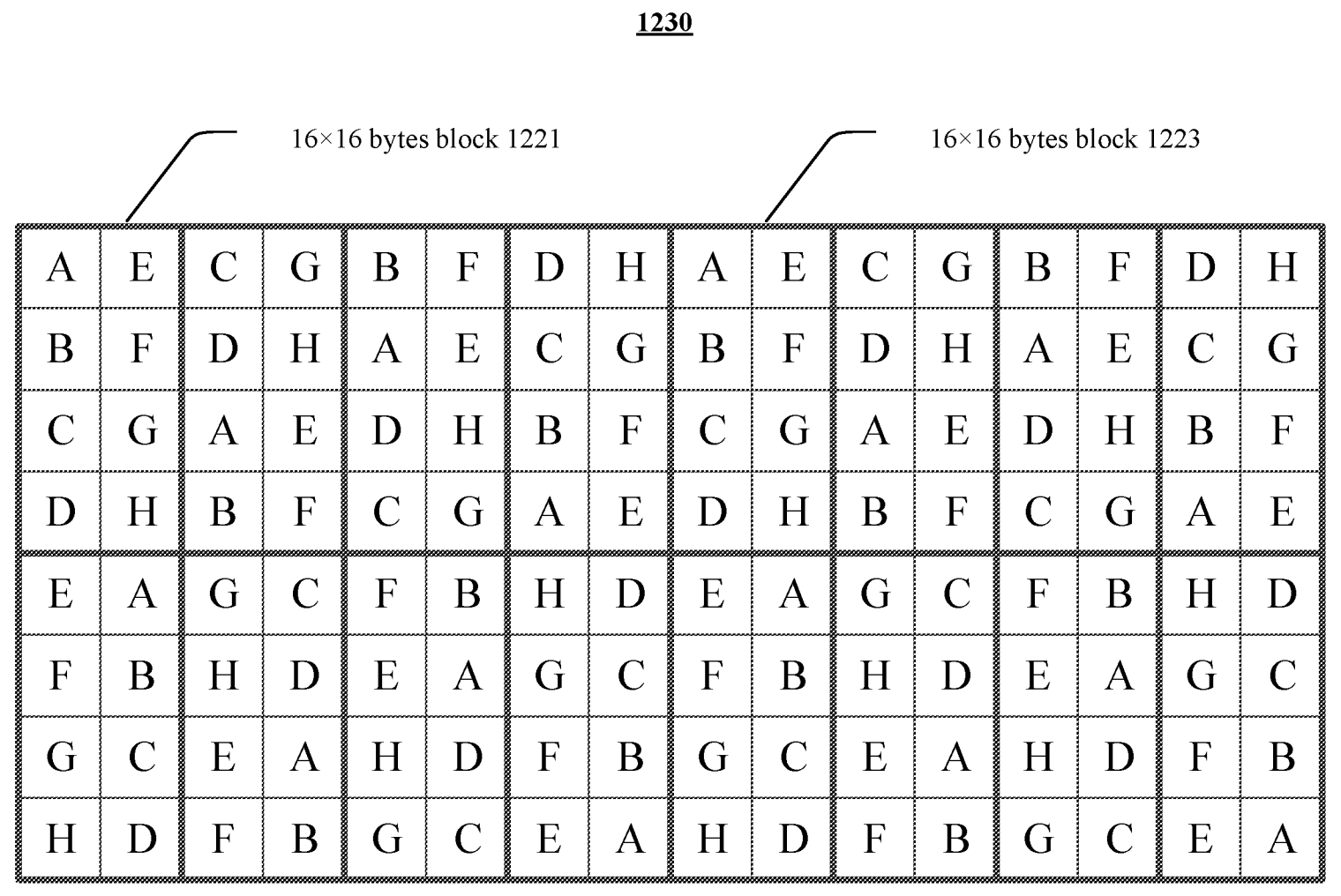

FIG. 12B illustrates an example pattern 1230 for mapping the logic banks to corresponding addresses. In particular embodiment, the addresses for the texture memory may be mapped to the logical banks in a 2D pattern in which each 16×16 byte block (e.g., 1221, 1223, as marked by heavy lines) may include all eight logical banks. The eight logical banks in each 16×16 byte block may be arranged with different orders within the block. The order of the eight logical banks within a block may be generated by rotating one or more bank positions or/and switching one or more bank positions. As a result, any texture memory access that results in a rectangular addressing area ranged from 1×1 blocks to 8×8 blocks may be evenly distributed among the eight banks. In other words, each bank may be accessed either N or N+1 times, where N can be determined by the following equation:

$$N = \text{floor}\left(\frac{\text{width} \times \text{height}}{8}\right) \quad (3)$$

In particular embodiments, this address mapping pattern allows the accesses to the texture memory to be sufficiently spread among the banks, and therefore allows the system to run the Static random-access memories (SRAMs) at lower speed (e.g., half speed) and still have two bank accesses per clock for the pipelines and two bank accesses for the stream in path, which cannot be stalled.

Figure 13A:
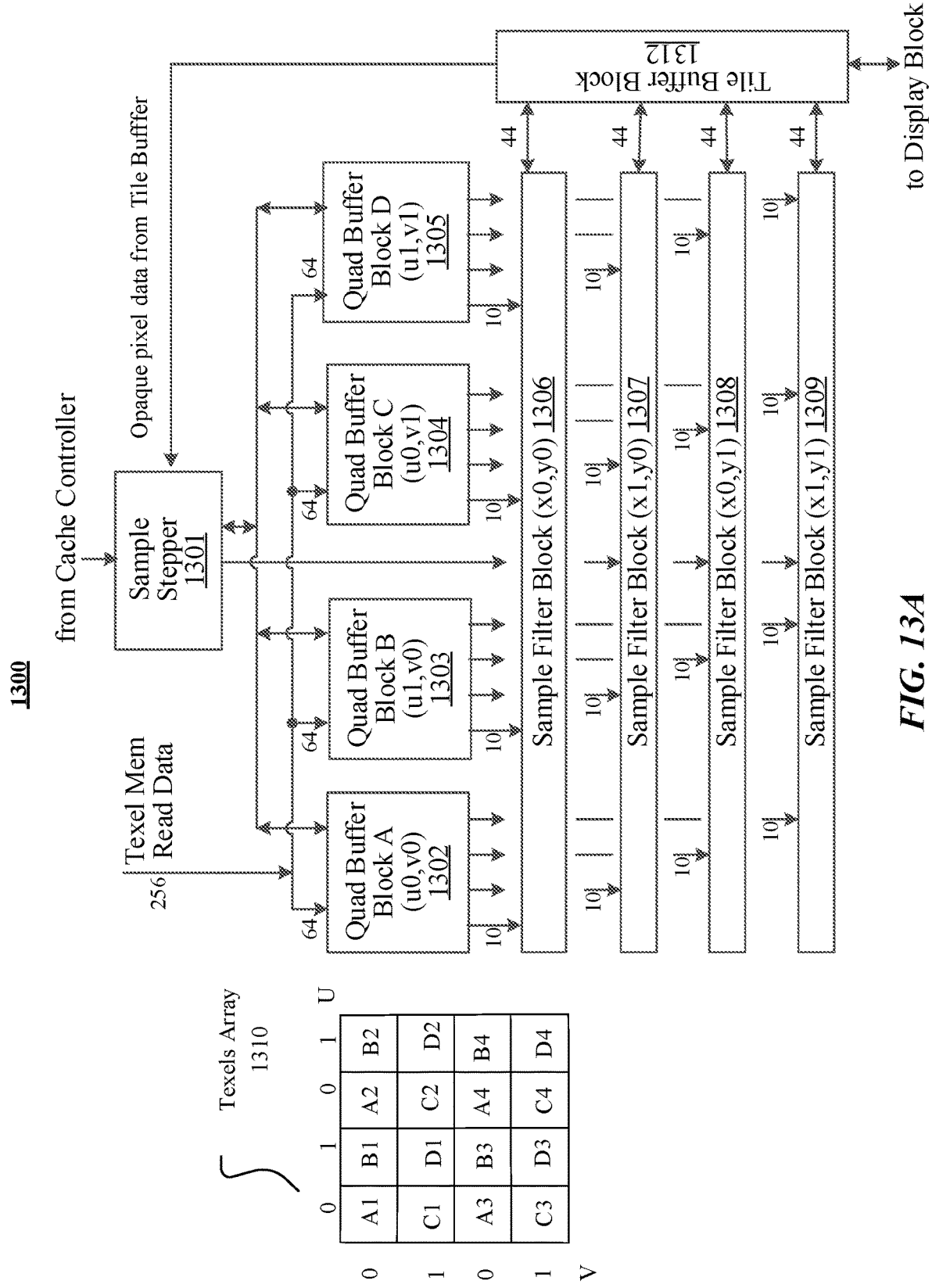
FIG. 13A illustrates an example diagram for filter blocks of pixel block.

FIG. 13A illustrates an example diagram 1300 for filter blocks of pixel block (e.g., 230A, 230B in FIG. 2). In particular embodiments, a pixel block may include three filter blocks for three colors of red, green, and blue. Each filter block may include a sample stepper 1301, four quad buffer blocks (e.g., 1302, 1303, 1304, 1305), four sample filter blocks (e.g., 1306, 1307, 1308, 1309), a tile buffer block 1312, data buses, etc. The filter blocks may perform bilinear filtering on data stored in a set of internal buffers including the quad buffer blocks (e.g., 1302, 1303, 1304, and 1305). Four groups of texels for four sampling positions may be sampled in parallel in the sample filter blocks 1306, 1307, 1308, and 1309, respectively. The results may be blended with data previously written to those pixel positions by the tile buffer block 1312. Finally, the tile buffer block 1312 may return information (e.g., opaque pixel data) to the sample stepper 1301 to allow optimizing subsequent accesses to the same tile. Texels in texel memory (e.g., 214 in FIG. 2) of the control block may be organized and accessed in 256-bit units including four 64-bit sub-word so that each quad buffer block may input its own 64-bit sub-word out of the 256-bit texel memory access. Each 16-bits of a 256-bit texel memory access may contain texels for a different position within an aligned 4×4 of texel array. Texel memory of the control block may be organized in multiple banks, as descripted earlier, so that a 256-bit access may read an aligned 4×4 block of 16-bit texels, or a half 4×4 block of 32-bit texels.

In particular embodiments, each quad buffer block may input, through the 64-bit bus, four 16-bit sub-words (e.g., 16-bit texels or half of 32-bit texels) that are at the same position in an aligned 2×2 texel region. For example, the quad buffer block 1302 may get the 16-bit sub-words associated with the texels (e.g., A1, A2 A3 and A4 in texel array 1310) whose local (U, V) coordinates within corresponding 2×2 texel array are zero (0, 0). Similarly, the quad buffer block 1303 may get the 16-bit sub-words associated with the texels (e.g., B1, B2, B3, B4 in texel array 1310) whose local (U, V) coordinates within corresponding 2×2 texel array are (1, 0). The quad buffer block 1304 may get the 16-bit sub-words associated with the texels (e.g., C1, C2, C3, C4 in texel array 1310) whose local (U, V) coordinates within corresponding 2×2 texel array are (0, 1). The quad buffer block 1305 may get the 16-bit sub-words associated with the texels (e.g., D1, D2, D3, D4 in texel array 1310) whose local (U, V) coordinates within corresponding 2×2 texel array are (1, 1). The 4×4 texels array 1310 may have each texel to be stored in respective quad buffer blocks as indicated by the letters (e.g., Ax in quad buffer block 1302, Bx in quad buffer block 1303, Cx in quad buffer block 1304, Dx in quad buffer block 1305). As a result, the four quad buffer blocks 1302, 1303, 1304, and 1305 may provide arbitrarily aligned 2×2 texels for interpolation. For example, the quad buffer blocks 1302, 1303, 1304, and 1305 may each send a texel contained within a 2×2 texel array to each sample filter block (e.g., 1306, 1307, 1308, 1309). Consequently, each sample filter blocks may receive the four texels corresponding a 2×2 texel array and perform interpolation on the texels.

In particular embodiments, the filter block may contain four sample filter blocks (e.g., 1306, 1307, 1308, 1309) each of which may get data input from four quad buffer blocks (e.g., 1302, 1303, 1304, 1305), as well as from the sample stepper 1301. The four sample filter blocks may compute a 2×2 block of sample positions in texture (U, V) space, which correspond to an aligned 2×2 block of pixel positions on the display. In particular embodiments, the sample filter blocks may output the results to display blocks through the tile buffer block 1312. In particular embodiments, the sample stepper 1301 may sequence sample positions through the quad buffer blocks and the sample filter blocks. The sample stepper 1301 may send the quad buffer blocks the addresses of texels for read operations and may specify the data format for the data being sent to the sample filter blocks. The sample stepper 1301 may provide filter weights and other control to the sample filter blocks. In particular embodiments, the system may support multiple types of surface data, some of which may require multiple cycles of interpolation operations per pixel in the sample filter blocks.

FIG. 13B illustrates an example diagram 1310 for quad buffer block (e.g., 1302, 1303, 1304, 1305 in FIG. 13A). In particular embodiments, a quad buffer block may include four texel buffer blocks (e.g., 1321, 1322, 1323, 1324), four quad increment blocks (e.g., 1331, 1332, 1333, 1334), eight multiplexors (e.g., 1325A-H), data bus, address bus, etc. In aggregate, the 16 texel buffer blocks of the four quad buffer blocks may buffer texels for each position in a 4×4 texel array. In particular embodiments, each texel buffer block may store texels that have the same local (U, V) coordinates and are stored in the same quad buffer block. As an example and not by way of limitation, a 4×4 texel array stored in the quad buffer block 1302 may be stored in the corresponding four texel buffer blocks of 1321, 1322, 1323, and 1324 in a pattern as shown in FIG. 13B. The texel buffer block 1321 may store the texels of A1, A3, A9, A11 each of which has the local (U, V) coordinates of (0, 0). The texel buffer block 1322 may store the texels of A2, A4, A10, A12 each of which has the local (U, V) coordinates of (1, 0). The texel buffer block 1323 may store the texels of A5, A7, A13, A15 each of which has the local (U, V) coordinates of (0, 1). The texel buffer block 1324 may store the texels of A6, A8, A14, A16 each of which has the same local (U, V) coordinates of (1, 1). As a result, storing texels in such patterns may allow the 4×4 texel array to have its 16 texels to be stored in 16 separate texel buffer blocks, and therefore to be retrieved from the texel buffer in one read operation.

In particular embodiments, texel data may be stored in the texel buffers in wraparound form within each 32×32 texel region. That is, incrementing texel U address from 31 to 32 may wrap around to texel address 0 within a given 32×32 texel block in texel buffers of the filter block. This may allow the (U, V) address of the texel and the offset to the 32×32 texel region to be the same for all of the filter blocks and may require loading only those texels that are required in a filter block's unaligned 32 texel-wide buffer region. In particular embodiments, the display engine may use a more complex algorithm including aligning reads to 2×2 texel boundaries instead of 4×4, using variable size regions in the filter buffers, or re-using texel data from one tile that is also required by an adjacent tile. In particular embodiments, the texel buffer blocks in a specific quad buffer block may buffer texels that have the same low order bit for (U, V) coordinates. For example, texel buffer block 1321 may store texels where bit<1> of the U and V addresses are zero and bit<0> of the U and V addresses are specified by their quad buffer block. The read address for the texel buffer blocks may specify the texel at the start of an arbitrarily aligned 4×4 block of texels. The quad increment blocks (e.g., 1331, 1332, 1333, 1334) may detect cases where bit<1> of the U or V addresses stored in the block is zero but the corresponding read address bit is 1. The remainder of the U or V address may be incremented, wrapping around within a 32×32 texel region. As a result, the texel buffers can address whatever alignment of 4×4 texels covering the texels that are needed by sample filter blocks.

In particular embodiments, the multiplexors (e.g., 1325E-H) on the right in the quad buffer block diagram 1310 may allow each sample filter block to select which texel buffer block to access so that it can bilinearly interpolate each sample in the corresponding 4×4 texel region. Within a single quad buffer block, each sample filter block may select whether bit<1> of the U and V address should be zero or one. This choice may be made separately within each quad filter block, resulting in each sample filter block getting the 2×2 of texels that it needs. The multiplexor may select bits of the texel data coming from the sample stepper block. The multiplexors (e.g., 1325A-E) on the left in the quad buffer block diagram may perform a different function from the multiplexors on the right, that is, sending information to the sample stepper from the selected texel buffer block. This allows the sample stepper to optimize sample filter sequencing.

Figure 14A:
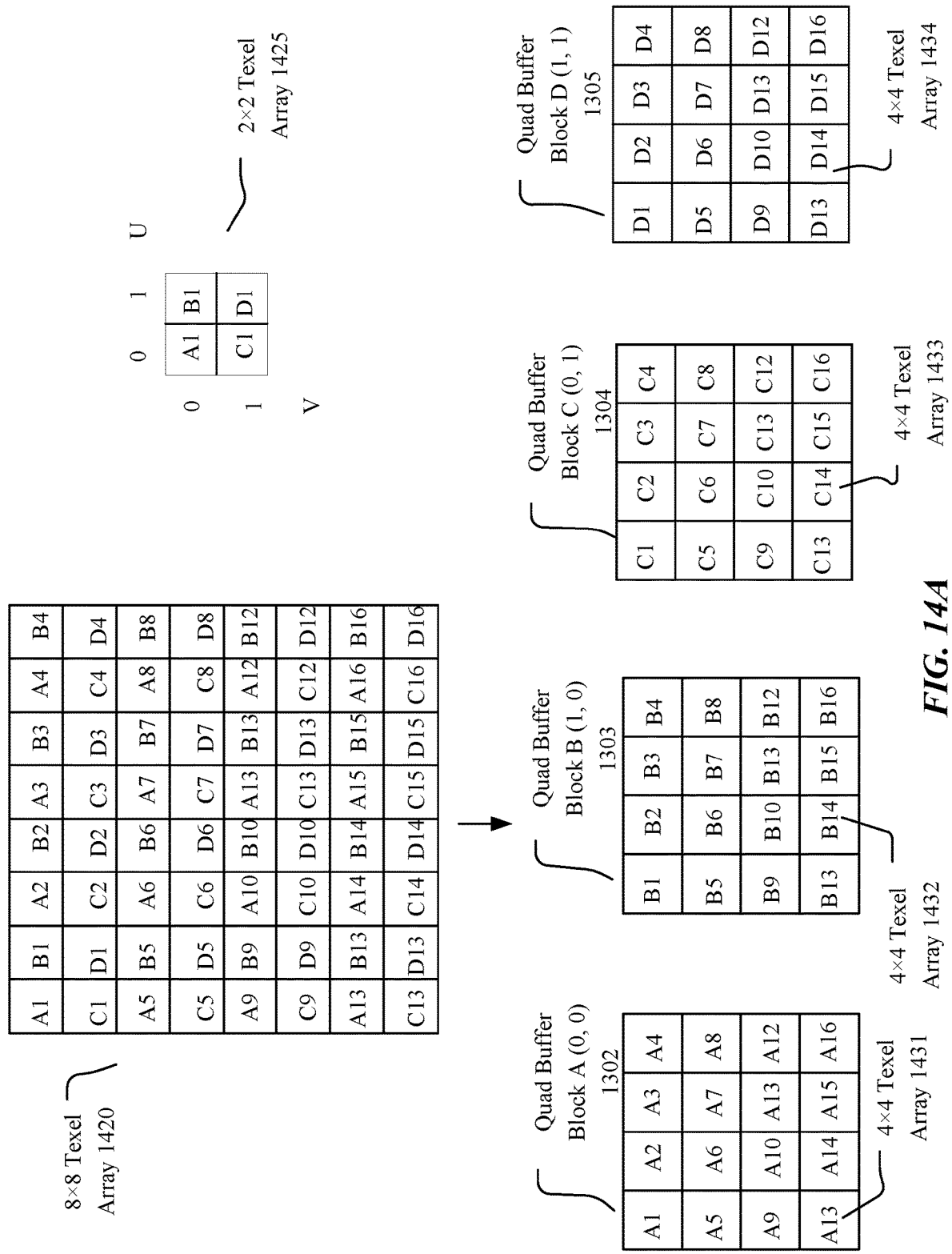
FIGS. 14A-14B illustrate an example 8×8 texel array stored in 16 independent texel buffer blocks to allow any 4×4 texel array to be read in one read operation.
Figure 14B:
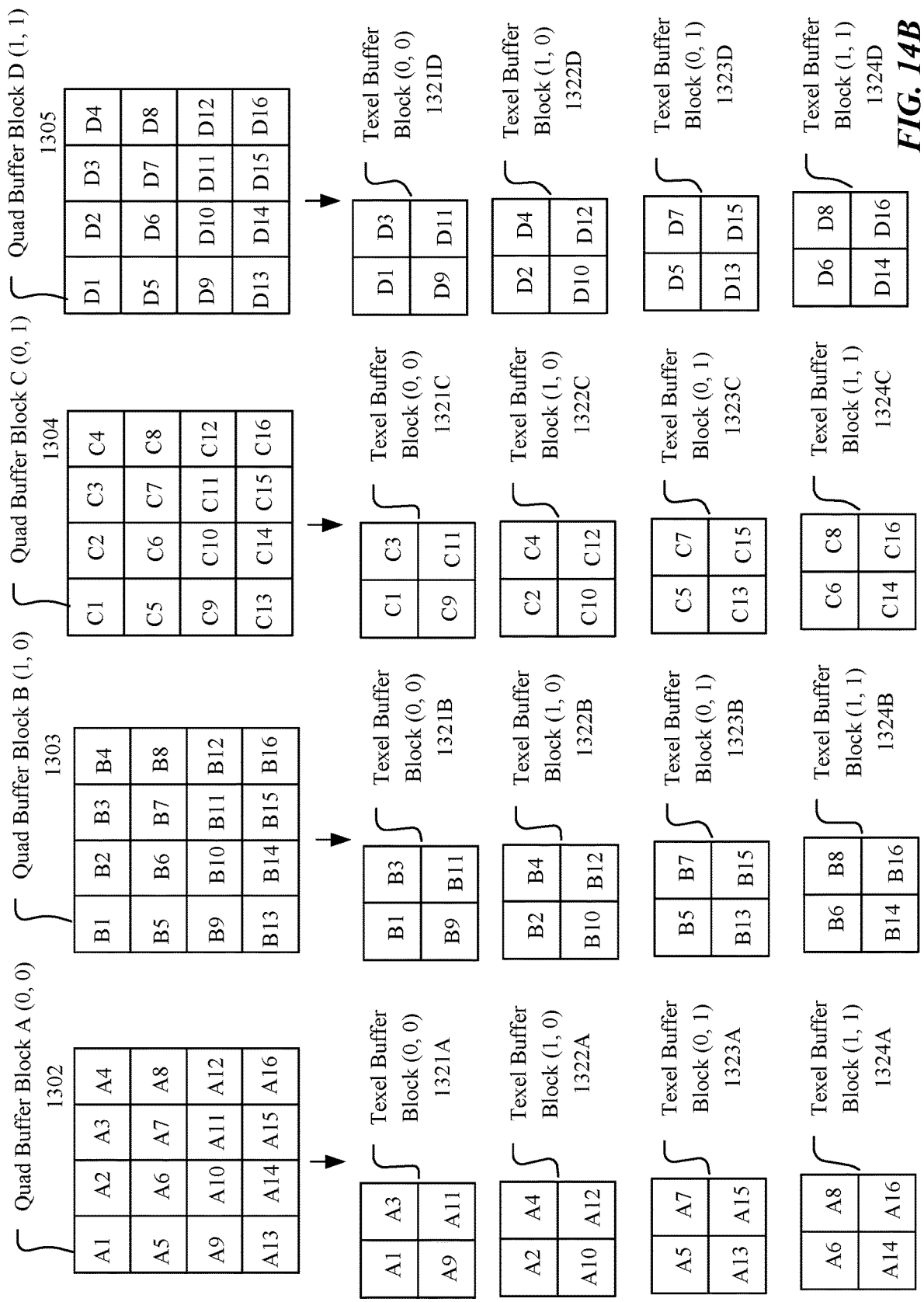

FIGS. 14A-14B illustrate an example 8×8 texel array stored in 16 independent texel buffer blocks to allow any 4×4 texel array to be read in one read operation. As descripted earlier, the texel buffer memory of the pixel blocks may be organized in multiple memory block levels including quad buffer block, texel buffer block, and sub-level buffer units. A pixel block of the display engine may include three filter blocks each including four quad buffer blocks (e.g., 1302, 1303, 1304, 1305 in FIG. 13A). Each quad buffer block may include four texel buffer blocks (e.g., 1321, 1322, 1323, 1324 in FIG. 13B). As a result, the pixel block of the display engine of particular embodiments may include 16 independent texel buffer blocks which could be addressed separately and accessed parallelly. For example, the display engine may read one texel from each of the 16 texel buffer block at the same time and retrieve 16 texels parallelly (e.g., using one read operation).

In particular embodiments, the display engine may load a 32×32 texel array from texel memory of the control block into the texel buffer blocks of the pixel block. The display engine may store/organize the 32×32 texel array with a pattern so that any 4×4 texel array (either aligned or unaligned array) may have its 16 texels being stored in 16 independent/separate text buffer blocks with one texel in each texel buffer block to allow any array with 4×4 texels to be read with one read operation. For description simplicity purpose, an example 8×8 texel array 1420 is used to illustrate the process, principle, and pattern for storing and organizing the 32×32 texel array in the texel buffer memory to allow parallel retrieving any aligned or unaligned array with 4×4 texels in one read operation. The 8×8 texel array 1420 may include 16 sub-arrays each having 2×2 texels (e.g., 2×2 texel array 1425). For description simplicity purpose, four texels in each 2×2 texel array (e.g., array 1425) may be represented by four characters A, B, C and D corresponding to the (U, V) coordinates of (0, 0), (1, 0), (0, 1), and (1, 1), respectively. For example, in the 2×2 texel array 1425, the texel (0, 0), texel (1, 0), texel (0, 1), and texel (1, 1) may be represented by A1, B1, C1, and D1, respectively.

In particular embodiments, the four quad buffer blocks may each include the texels at the same position as indicated by (U, V) coordinates in the respective 2×2 texel arrays. For example, the quad buffer block 1302 may include the texel at the position of (0, 0) in each 2×2 texel array. For the example 8×8 texel array 1420, the quad block 1302 may include the texels from A1 to A16 each of which is at the position (0, 0) in its corresponding 2×2 texel array. The texels A1-16 in the quad buffer block 1302 may conceptually form a 4×4 texel array 1431 as shown in FIG. 14A. As another example, the quad buffer block 1303 may include the texel at the position of (1, 0) in each 2×2 texel array. For the example 8×8 texel array 1420, the quad block 1303 may include the texels from B1 to B16 each of which is at the position (1, 0) in its corresponding 2×2 texel array. The texels B1-16 in the quad buffer block 1303 may conceptually form a 4×4 texel array 1432 as shown in FIG. 14A. As another example, the quad buffer block 1304 may include the texel at the position of (0, 1) in each 2×2 texel array. For the example 8×8 texel array 1420, the quad block 1304 may include the texels from C1 to C16 each of which is at the position (1, 0) in its corresponding 2×2 texel array. The texels C1-16 in the quad buffer block 1304 may conceptually form a 4×4 texel array 1433 as shown in FIG. 14A. As another example, the quad buffer block 1305 may include the texel at the position of (1, 1) in each 2×2 texel array. For the example 8×8 texel array 1420, the quad block 1305 may include the texels from D1 to D16 each of which is at the position (1, 1) in its corresponding 2×2 texel array. The texels D1-16 in the quad buffer block 1305 may conceptually form a 4×4 texel array 1434 as shown in FIG. 14A.

FIG. 14B illustrates example patterns that are used for storing texels in texel buffer blocks. As descripted earlier, a quad buffer block may include four texel buffer blocks. The texels stored in each quad buffer block may conceptually form a 4×4 texel array (e.g., A1-16) including four 2×2 texel arrays. For example, the A1-16 stored in the quad buffer block 1302 may form a 4×4 texel array including four 2×2 texel sub-arrays of (A1, A2, A5, A6), (A3, A4, A7, A8), (A9, A10, A13, A14), and (A11, A12, A15, A16). Each texel in a 2×2 texel array may have its local (U, V) coordinates. For example, the texel A1, A2, A5, A6 may have the local (U, V) coordinates of (0, 0), (1, 0), (0, 1), and (1, 1) in the texel array of (A1, A2, A5, A6), respectively. In particular embodiments, each texel buffer block of a quad buffer block may include texels at the same local (U, V) coordinate. For example, the texel buffer block 1321A may include A1, A3, A9, and A11 each of which is at the position of (0, 0) in respective 2×2 texel arrays of (A1, A2, A5, A6), (A3, A4, A7, A8), (A9, A10, A13, A14), and (A11, A12, A15, A16). As another example, the texel buffer block 1322A may include A2, A4, A10, and A12 each of which is at the position of (1, 0) in respective 2×2 texel arrays of (A1, A2, A5, A6), (A3, A4, A7, A8), (A9, A10, A13, A14), and (A11, A12, A15, A16). As another example, the texel buffer block 1323A may include A5, A7, A13, and A15 each of which is at the position of (0, 1) in respective 2×2 texel arrays of (A1, A2, A5, A6), (A3, A4, A7, A8), (A9, A10, A13, A14), and (A11, A12, A15, A16). As another example, the texel buffer block 1324A may include A6, A8, A14, and A16 each of which is at the position of (1, 1) in respective 2×2 texel arrays of (A1, A2, A5, A6), (A3, A4, A7, A8), (A9, A10, A13, A14), and (A11, A12, A15, A16). Similarly, the texels buffer blocks of other quad buffer blocks may store the texels of the corresponding quad buffer block in similar patterns, as shown in FIG. 14B. As a result, the 64 texels in the 8×8 texel array may be stored in the 16 texel buffer blocks (e.g., 1321A-D, 1322A-D, 1323A-D, 1324A-D) in such a pattern that allows any sub-array with 4×4 texels to have its 16 texels being stored in the 16 texel buffer blocks separately (with one texel in each texel buffer block). Therefore, any 4×4 texel array stored in the texel buffer blocks may have its 16 texels to be addressed and accessed parallelly from the 16 separate texel buffer blocks.

Figure 14C:
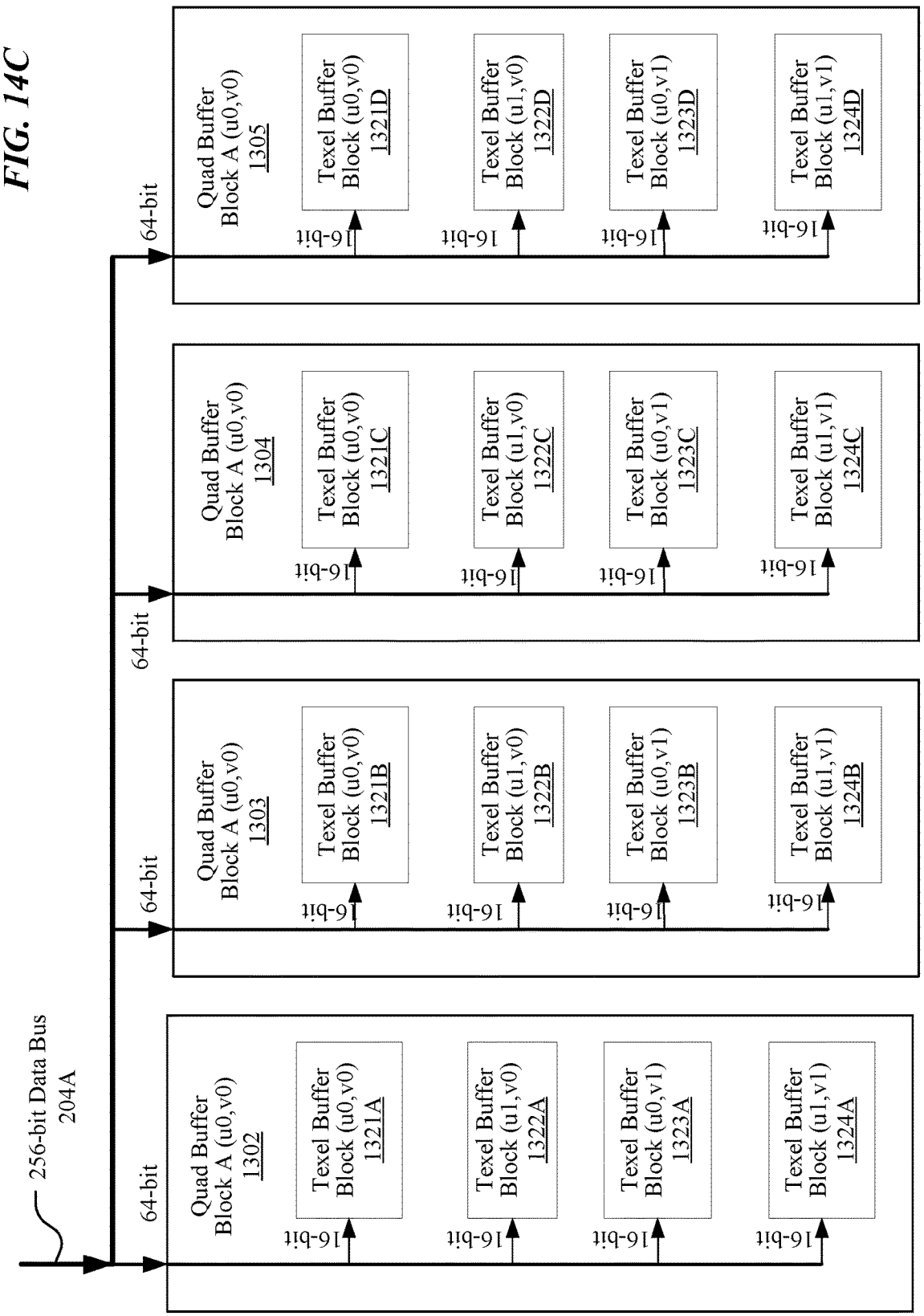
FIG. 14C illustrates an example process for loading texel data from texel memory to texel buffer blocks without multiplexing.

FIG. 14C illustrates an example process for loading texel data from texel memory to texel buffer blocks without multiplexing. As shown in FIG. 2, the control block may be connected to each pixel block by a 256-bit data bus (e.g., 204A, 204B in FIG. 2). As described earlier, the texel data stored in the texel memory of control block may be addressed and retrieved in 256-bit data units or smaller data units (e.g., 64-bit sub-words). When texel data is retrieved in 256-bit data units, each 256-bit data unit may include four 64-bit sub-words. When a 256-bit data unit is passed to the pixel block through the 256-bit data bus 204A, each quad buffer block (e.g., 1302, 1303, 1304, 1305) in that pixel block may get its 64-bit sub-words directly from the 256-bit data unit via the 64-bit data bus without any multiplexing. Furthermore, each 64-bit sub-words may include four 16-bit data units and each texel buffer block (e.g., 1321A-D, 1322A-D, 1323A-D, 1324A-D) may get its 16-bit data unit within the 64-bit data unit directly through the 16-bit data bus connecting that texel buffer block, without any multiplexing. As a result, a 256-bit data unit read from texel memory may be directed routed into the 16 texel buffer blocks without any multiplexing. The 256-bit data unit may be retrieved from the texel memory of control block using one read operation and may be stored into the four quad buffer blocks during one operation cycle.

As another example, when texel data is retrieve in 64-bit data units from the texel memory in control block, each 64-bit data unit may include four 16-bit data units. When a 64-bit data unit is passed to the pixel block through the 256-bit data bus 204A, the corresponding quad buffer block may directly get the 64-bit data unit through the 64-bit data bus connecting that quad buffer block without any multiplexing. Furthermore, each texel buffer block (e.g., 1321A-D, 1322A-D, 1323A-D, 1324A-D) may get its 16-bit data unit within the 64-bit data unit directly through the 16-bit data bus connecting that texel buffer block without any multiplexing. As a result, the texel data read from texel memory of control block in 64-bit data units may be directed routed into corresponding four texel buffer blocks without any multiplexing. A 64-bit data unit may be retrieved from the texel memory of control block using one read operation and may be stored into the quad buffer block during one operation cycle. Therefore, the quad buffer block architecture of particular embodiments significantly improves the efficiency and speed and for loading texel data from texel memory of control block to texel buffer of pixel block by eliminating the excessive multiplexing operations that are used by traditional graphic rendering systems, and significantly reduces the power consumption of the system.

In particular embodiments, texel array organized in swizzle patterns may allow efficient reading (e.g., using one read operation to read one data unit in swizzle pattern) for aligned texel arrays (e.g., 4×4 texel array for 16-bit and 32-bit texels, 8×4 texel array for 8-bit texels). However, reading unaligned texel arrays may pick up some texels that are not needed, and therefore have wasted read operations. For example, an unaligned texel array may include 5×5 texels stored in texel memory that is organized into aligned 4×4 arrays using the swizzle patterns. However the 5×5 texels are aligned onto the 4×4 arrays, reading the 5×5 texel array will pick up some texels that are not needed since the texel memory is retrieved in aligned texel arrays (e.g., 4×4 texels, 8×8 texels).

As described earlier, the swizzle patterns that are used for organizing the texel may fit an aligned texel array (e.g., 4×4 texel array for 16-bit texels, 4×4 texel array for half 32-bit texels, 8×4 texel array for 8-bit texels) into a 256-bit memory unit in a way that allows the 256-bit memory to be divided into four 64-bit units with each 64-bit unit including a sub-array with 2×2 texels. Therefore, the swizzle patterns may allow the texel data to be addressed and accessed in 64-bit sub-words with each 64-bit sub-word including a 2×2 texel array. In particular embodiments, the display engine may access the texel data in data units which have a smaller size than 256-bit. For example, the data unit sizes that can be used for accessing texel data may be listed in the first two columns in Table 2. Particular embodiments of the system may use the 64-bit sub-words to access texel data, and therefore significantly reduce wasted read operations for reading unaligned texel arrays, as discussed below.

TABLE 2

| W Value | H Value | Texels Number Accessed | % Ref (1, 1) | % Ref (2, 1) | % Ref (2, 2) | % Ref (2, 4) | % Ref (4, 4) | % Ref (4, 8) |
|---|---|---|---|---|---|---|---|---|
| 1 | 1 | 289 | 100% | 94% | 89% | 80% | 72% | 60% |
| 2 | 1 | 306 | 106% | 100% | 94% | 85% | 77% | 64% |
| 2 | 2 | 324 | 112% | 106% | 100% | 90% | 81% | 68% |
| 2 | 4 | 360 | 125% | 118% | 111% | 100% | 90% | 75% |
| 4 | 4 | 400 | 138% | 131% | 123% | 111% | 100% | 83% |
| 4 | 8 | 480 | 166% | 157% | 148% | 133% | 120% | 100% |
| 1 | 16 | 544 | 188% | 178% | 168% | 151% | 136% | 113% |

As an example and not by way of limitation, for accessing the texels needed to process a 16×16 pixel block that is at 1:1 scale (i.e., the pixels are one unit apart in U and V in texel space), an unaligned 17×17 texel array may need to be read to bilinearly interpolate 16×16 pixels (to give an extra line of texels for edge). In general, for a W×H read block randomly placed onto texel memory that store N×M texels (e.g., 17×17 texels), (W+N−1)×(H+M−1) texels may be accessed on average. In Table 2, the unaligned 17×17 texel array is used as an example to compare the efficiency of different memory access size for reading texel data, where the first two columns specify the W and H values of the access sizes; the third column displays the total texels accessed; and the remaining columns specify the efficiency rate of each access size relative to other access sizes. As shown in Table 2, reading texel data with 16×1 blocks may result in 36% more texel access than using 4×4 texel blocks, which indicates that square access size provides better reading efficiency. The access size of 2×2 texels, which corresponds to the 64-bit sub-words reading, provides a higher data reading efficiency with 12% waste texels than the 4×4 texel blocks (which corresponds to 256-bit access size), which results in reading 38% waste texels. As a result, particular embodiments of the system may significantly reduce memory bandwidth by using 64-bit sub-words to read the unaligned texel arrays.

Figure 15:
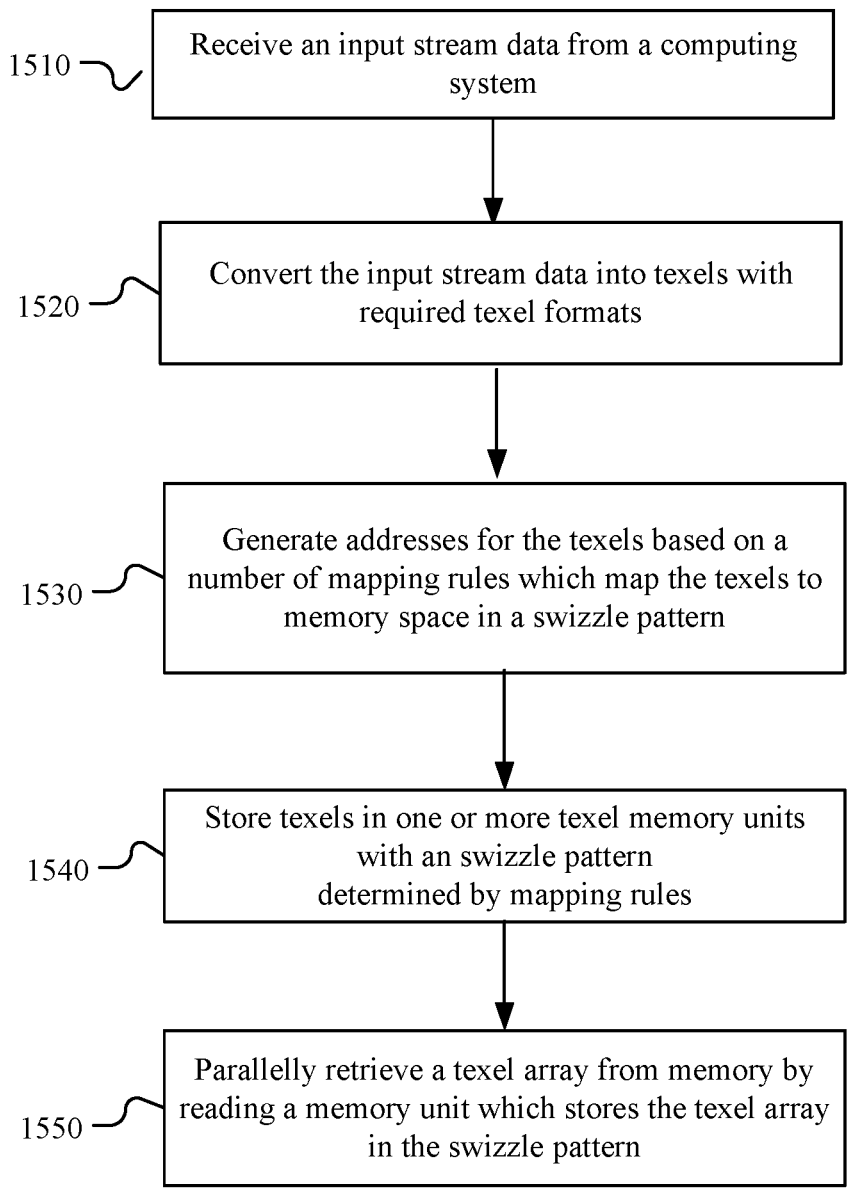
FIG. 15 illustrates an example method for storing texels arrays in texel memory in a swizzle pattern.

FIG. 15 illustrates an example method 1500 for storing texels arrays in texel memory in a swizzle pattern. The method 1500 may begin at step 1510, where the headset system may receive input stream data from a body wearable computing system. In particular embodiments, the input stream data may include the pixel data or/and texel generated by the body wearable computing system. The pixels or/and texels in the input stream data may be ordered linearly according to their respective positions on an associated surface (e.g., pre-warped surfaces generated by the body wearable computing system).

At step 1520, the headset system may convert the input stream data into texels with required formats. In particular embodiments, the headset system may support multiple texel formats including, for example, but not limited to, 16-bit RGBA 4/4/4/4 format, 16-bit RGBA 5/5/5/1 format, 32-bit RGBA 8/8/8/8 format, 32-bit RGBA 10/10/10/2 format, 6-bit distance field format (with 6-bit distance field and 2-bit color index in a 8-bit texel), dual 6-bit distance field format (with two 6-bit distance fields and two 2-bit color indices in a 16-bit texel), etc. In particular embodiments, the headset system may use 32-byte memory unit as the memory unit to store and organize texels so that all the texels stored in a 32-byte memory could be read out parallelly using one read operation. For example, a 32-byte memory unit may store a 4×4 texel array for 16-bit texels, an 8×4 texel array for 8-bit texels, a 4×16 texel array for 4-bit texels, an 8×16 texel array for 2-bit texels, or a 16×16 texel array for 1-bit texels, respectively. For 32-bit texels, a 4×4 32-bit texel array may need to be stored in two 32-byte memory units. The headset system may split each 32-bit texel into a 16-bit high half texel data and a 16-bit low half texel data. The 4×4 32-bit texel array may be divided into two 4×4 16-bit texel arrays by splitting each texel into high and low halves and each 4×4 16-bit texel array may be stored in a 32-byte memory unit.

At step 1530, the headset system may generate texel addresses that map the texels to texel memory in a swizzle pattern. In particular embodiments, the system may generate texel addresses based on a number of mapping rules. The system may first order all texels in a 4×4 texel array in a swizzle order following the mapping rules. The ordered texels may be mapped to the address space (e.g., byte 0 to byte 31) of the 32-byte memory unit. In particular embodiments, the system may divide each 32-byte memory unit into four 8-byte memory units each of which may store a 2×2 texel array. In particular embodiments, the texels in the 2×2 texel array may be ordered based on their local (U, V) coordinates which may indicate the relative position of the texel within the 2×2 texel array. The four texels in a 2×2 texel array may be ordered in any possible orders with respect to each other. For example, the texels in a 2×2 texel array including a reference texel (u, v) may be ordered by a first order of (u+0, v+0), (u+1, v+0), (u+0, v+1), (u+1, v+1), a second order of (u+0, v+1), (u+0, v+0), (u+1, v+1), (u+1, v+0), etc. In particular embodiments, for 8-bit texels, two 2×2 texel array may be ordered in an interleaved manager. For example, two 2×2 8-bit texel arrays associated with a reference texel (u, v) may be interleaved by an order of (u+0, v+0), (u+4, v+0), (u+1, v+0), (u+5, v+0), (u+0, v+1), (u+4, v+1), (u+1, v+1), (u+5, v+1) with respect to the reference texel (u, v).

In particular embodiments, the headset system may generate an 8-bit address for each texel and the 8-bit address may map that texel to a 1-byte space in a 32-byte memory unit. In particular embodiments, the headset system may include 8 logic banks which could be selected using a 3-bit address. The memory space in each logic banks may be divided to 32-byte memory units each of which may be used to store a 4×4 texel array. A 32-byte memory unit may correspond to a 5-bit address space. In particular embodiments, the 8 bits byte address may use the higher three bits (bit 7~bit 5) for selecting a logic bank from 8 logic banks of the texel memory and may use the lower five bits (bit 4-bit 0) to select a byte from a 32-byte memory unit. In particular embodiments, the system may use a 11-bit byte address to access each bit in the 32-byte memory unit. For example, the high 8 bits (T7, T6, T5, T4, T3, T2, T1) may be used for accessing each byte within the 32-byte memory unit and the lowest 3 bits $t_1$, $t_2$, $t_3$ may be used to access each bit within a byte.

At step 1540, the headset system may use the generated addresses to store the texels into one or more texel memory units, and the texels may be stored in a swizzle pattern determined by mapping rules. At step 1350, the headset system may parallelly retrieve all texels in a texel array from a 32-byte memory unit of the texel memory using one read operation. Since each 32-byte memory unit stores the texel array in the swizzle pattern, all texels retrieved from that 32-byte memory may be associated with that texel array, and therefore are useful for later processes (e.g., interpolation for determining all pixels associated with a projected tile). As a result, particular embodiments of the headset system reduce wasted memory reading and increase the memory usage efficiency.

In particular embodiments, a computing system may receive a number of texels organized into a two-dimensional array. The system may generate addresses for the texels based on one or more mapping rules which may map the texels from the two-dimension array into a one-dimensional array corresponding to a pre-determined size in a texel order. The system may store the texels organized in the one-dimensional array into a memory block having the pre-determined size. The system may read the texels from the memory block onto a data bus using one data reading operation. The data bus may include a number of segments each being connected to an independent buffer memory block. The system may load the texels directly into a number of buffer memory blocks through the data bus. The data bus may include a number of data lines corresponding to different combinations of low order address bits of addresses of the texels within the two-dimension array. The texel order of the one-dimensional array may map texels having same low order address bits into same data lines. In particular embodiments, the texel order may map the texels having same low order address bits to the same data lines using a mapping relationship which may be applicable to a number of texel sizes including, for example, but not limited to, at least an 8-bit texel size, a 16-bit texel size, and a 32-bit texel size, etc. In particular embodiments, the memory block may be accessible by one data reading operation. The texels may be read from the memory block using one data reading operation. In particular embodiments, the texels may be loaded into the buffer memory blocks using one or more data writing operations excluding multiplexing operations.

In particular embodiments, the one or more mapping rules may map the texels from the two-dimensional array into the one-dimensional array using a swizzle pattern. In particular embodiments, the two-dimensional array may be a 4×4 texel array with each texel having a 16-bit texel size. In particular embodiments, the memory block may have the pre-determined size of 32 bytes. In particular embodiments, the 4×4 texel array may include four 2×2 texel arrays. The swizzle pattern may order the four 2×2 texel arrays in an order of (0, 0), (1, 0), (0, 1), and (1, 1) based on relative positions the four 2×2 texel arrays with respect to each other. Each texel of a 2×2 texel array may have texels ordered by the swizzle pattern in an order of (u+0, v+0), (u+1, v+0), (u+0, v+1), and (u+1, v+1) with respect to a reference texel coordinate (u, v) of that 2×2 texel array.

In particular embodiments, the two-dimensional array may be an 8×2 texel array with each texel having a 8-bit texel size. The 8×2 texel array may be stored in a sub-portion of the memory block having the predetermined size of 32 bytes. The 8×2 texel array may include four 2×2 texel arrays. The one or more mapping rules map the texels using an interleaved swizzle pattern. In particular embodiments, the texels may be ordered by the interleaved swizzle pattern in an order of (u+0, v+0), (u+4, v+0), (u+1, v+0), (u+5, v+0), (u+0, v+1), (u+4, v+1), (u+1, v+1), (u+5, v+1) with respect to a reference texel (u, v).

In particular embodiments, the two-dimensional array may be a 2×2 half-texel array. Each member of the 2×2 half-texel array may correspond to a 16-bit representation for half of a 32-bit texel value. The 2×2 half-texel array may be stored in a sub-portion of the memory block having the pre-determined size of 32 bytes. In particular embodiments, the 2×2 half-texel array may have the four 16-bit texel representations ordered by a swizzle pattern in an order of (u+0, v+0), (u+1, v+0), (u+0, v+1), and (u+1, v+1) with respect to a reference texel coordinate (u, v) of that 2×2 half-texel array.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for storing texels arrays in texel memory in a swizzle pattern including the particular steps of the method of FIG. 15, this disclosure contemplates any suitable method for storing texels arrays in texel memory in a swizzle pattern including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Figure 16:
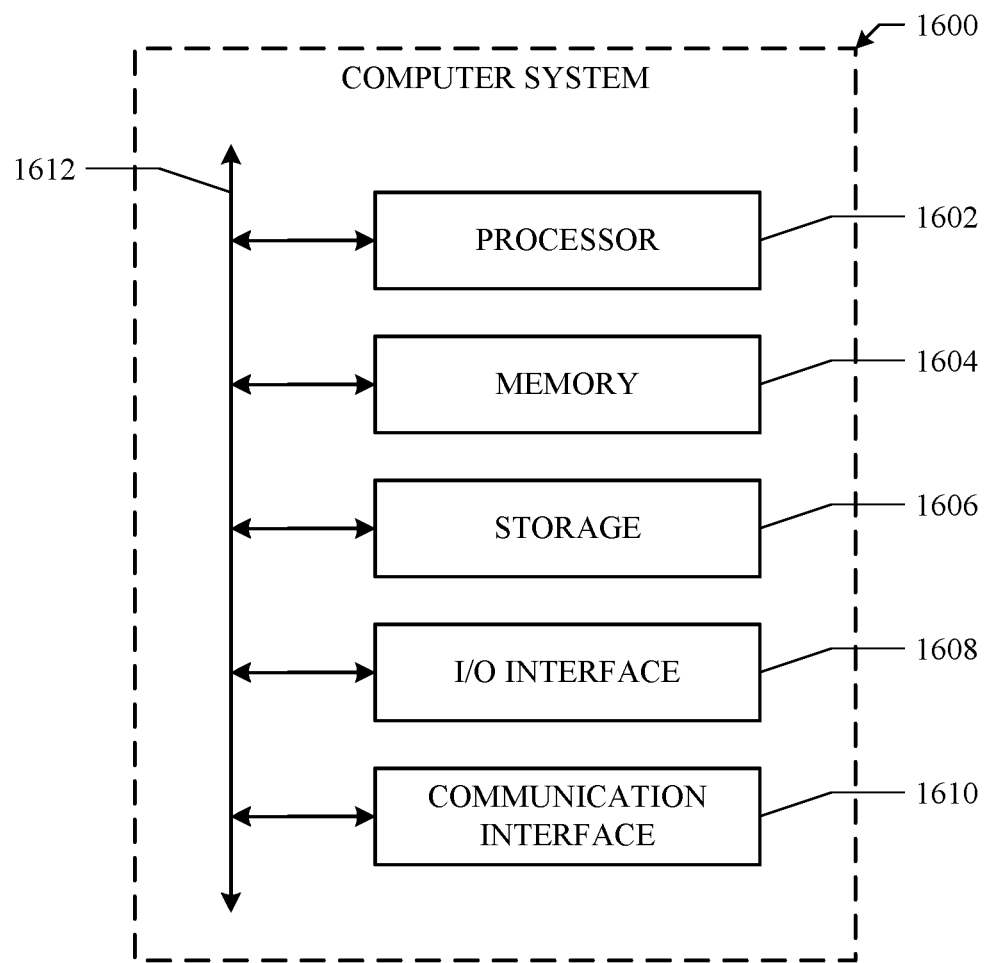
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving a plurality of texels organized as a two-dimensional array, wherein each texel has a first address in the two-dimensional array and is associated with low order address bits of the first address;
generating second addresses for the plurality of texels based on one or more mapping rules, wherein the one or more mapping rules map the plurality of texels from the two-dimension array into a one-dimensional array in a texel order, the one-dimensional array having a pre-determined size;
storing, based on the second addresses, the plurality of texels into a memory block having the pre-determined size, wherein the plurality of texels are stored as the one-dimensional array in the texel order;
reading the plurality of texels from the memory block onto a data bus that comprises a plurality of data lines, wherein the texel order of the plurality of texels stored in the memory block maps the plurality of texels to the plurality of data lines such that each subset of the plurality of texels that have the same associated low order address bits are read onto the same data line; and
loading the plurality of texels directly into a plurality of buffer memory blocks through the data bus.

2. The method of claim 1, wherein the texel order of the plurality texels stored in the memory block maps the plurality of texels to the plurality of data lines using a mapping relationship applicable to a plurality of texel sizes comprising at least an 8-bit texel size, a 16-bit texel size, or a 32-bit texel size.

3. The method of claim 1, wherein the memory block is accessible by one data reading operation, and wherein the plurality of texels is loaded into the plurality of buffer memory blocks via the data bus using one or more data writing operations excluding multiplexing operations.

4. The method of claim 1, wherein the one or more mapping rules map the plurality of texels from the two-dimensional array into the one-dimensional array using a swizzle pattern.

5. The method of claim 4, wherein the two-dimensional array is a 4×4 texel array, wherein each texel of the 4×4 texel array has a 16-bit texel size, and wherein the pre-determined size of the memory block is 32 bytes.

6. The method of claim 5, wherein the 4×4 texel array comprises four 2×2 texel arrays, and wherein the swizzle pattern orders the four 2×2 texel arrays in an order of (0, 0), (1, 0), (0,1), and (1, 1) based on relative positions of the four 2×2 texel arrays with respect to each other.

7. The method of claim 6, wherein each texel of each 2×2 texel array has texels ordered by the swizzle pattern in an order of (u+0, v+0), (u+1, v+0), (u+0, v+1), and (u+1, v+1) with respect to a reference texel coordinate (u, v) of that 2×2 texel array.

8. The method of claim 4, wherein the two-dimensional array is an 8×2 texel array, wherein each texel of the 8×2 texel array has an 8-bit texel size, wherein the 8×2 texel array is stored in a sub-portion of the memory block, and wherein the predetermined size of the memory block is 32 bytes.

9. The method of claim 8, wherein the 8×2 texel array comprises four 2×2 texel arrays, and wherein the one or more mapping rules map the plurality of texels using an interleaved swizzle pattern.

10. The method of claim 9, wherein the plurality of texels are ordered by the interleaved swizzle pattern in an order of (u+0, v+0), (u+4, v+0), (u+1, v+0), (u+5, v+0), u+0, v+1), (u+4, v+1), (u+1, v+1), (u+5, v+1) with respect to a reference texel (u, v).

11. The method of claim 4, wherein the two-dimensional array is a 2×2 half-texel array, wherein each member of the 2×2 half-texel array corresponds to a 16-bit representation for half of a 32-bit texel value, wherein the 2×2 half-texel array is stored in a sub-portion of the memory block, and wherein the pre-determined size of the memory block is 32 bytes.

12. The method of claim 11, wherein the 2×2 half-texel array has the four 16-bit texel representations ordered in an order of (u+0, v+0), (u+1, v+0), (u+0, v+1), and (u+1, v+1) with respect to a reference texel coordinate (u, v).

13. One or more computer-readable non-transitory storage media embodying software that is operable when executed to:
receive a plurality of texels organized as a two-dimensional array, wherein each texel has a first address in the two-dimensional array and is associated with low order address bits of the first address;
generate second addresses for the plurality of texels based on one or more mapping rules, wherein the one or more mapping rules map the plurality of texels from the two-dimension array into a one-dimensional array in a texel order, the one-dimensional array having a pre-determined size;
store, based on the second addresses, the plurality of texels into a memory block having the pre-determined size, wherein the plurality of texels are stored as the one-dimensional array in the texel order;
read the plurality of texels from the memory block onto a data bus that comprises a plurality of data lines, wherein the texel order of the plurality of texels stored in the memory block maps the plurality of texels to the plurality of data lines such that each subset of the plurality of texels that have the same associated low order address bits are read onto the same data line; and
load the plurality of texels directly into a plurality of buffer memory blocks through the data bus.

14. The media of claim 13, wherein the texel order of the plurality texels stored in the memory block maps the plurality of texels to the plurality of data lines using a mapping relationship applicable to a plurality of texel sizes comprising at least an 8-bit texel size, a 16-bit texel size, or a 32-bit texel size.

15. The media of claim 13, wherein the memory block is accessible by one data reading operation, and wherein the plurality of texels is loaded into the plurality of buffer blocks vis the data bus using one or more data writing operations excluding multiplexing operations.

16. The media of claim 13, wherein the one or more mapping rules map the plurality of texels from the two-dimensional array into the one-dimensional array using a swizzle pattern.

17. A system comprising:
one or more processors, and
one or more computer-readable non-transitory storage media coupled to one or more of the processors and comprising instructions operable when executed by one or more of the processors to cause the system to:
receive a plurality of texels organized as a two-dimensional array, wherein each texel has a first address in the two-dimensional array and is associated with low order address bits of the first address;
generate second addresses for the plurality of texels based on one or more mapping rules, wherein the one or more mapping rules map the plurality of texels from the two-dimension array into a one-dimensional array in a texel order, the one-dimensional array having a pre-determined size;
store, based on the second addresses, the plurality of texels into a memory block having the pre-determined size, wherein the plurality of texels are stored as the one-dimensional array in the texel order;
read the plurality of texels from the memory block onto a data bus that comprises a plurality of data lines, wherein the texel order of the plurality of texels stored in the memory block maps the plurality of texels to the plurality of data lines such that each subset of the plurality of texels that have the same associated low order address bits are read onto the same data line; and
load the plurality of texels directly into a plurality of buffer memory blocks through the data bus.

18. The system of claim 17, wherein the texel order of the plurality texels stored in the memory block maps the plurality of texels to the plurality of data lines using a mapping relationship applicable to a plurality of texel sizes comprising at least an 8-bit texel size, a 16-bit texel size, or a 32-bit texel size.

19. The system of claim 17, wherein the memory block is accessible by one data reading operation, and wherein the plurality of texels is loaded into the plurality of buffer blocks via the data bus using one or more data writing operations excluding multiplexing operations.

20. The system of claim 17, wherein the one or more mapping rules map the plurality of texels from the two-dimensional array into the one-dimensional array using a swizzle pattern.

* * * * *